US006698722B1

(12) United States Patent
Crawford

(10) Patent No.: US 6,698,722 B1
(45) Date of Patent: Mar. 2, 2004

(54) APPARATUS AND METHOD FOR USE IN HANDLING A LOAD

(75) Inventor: Alexander Charles Crawford, Fife (GB)

(73) Assignee: Deep Tek Limited, Fife (GB)

( * ) Notice: Subject to any disclaimer, the term of this patent is extended or adjusted under 35 U.S.C. 154(b) by 0 days.

(21) Appl. No.: 09/936,942

(22) PCT Filed: Mar. 22, 2000

(86) PCT No.: PCT/GB00/00978

§ 371 (c)(1), (2), (4) Date: Sep. 20, 2001

(87) PCT Pub. No.: WO00/56654

PCT Pub. Date: Sep. 28, 2000

Related U.S. Application Data

(63) Continuation of application No. 09/274,259, filed on Mar. 22, 1999, now Pat. No. 6,267,356.

(30) Foreign Application Priority Data

Oct. 5, 1999 (GB) ............................................ 9923447

(51) Int. Cl.$^{7}$ ................................................ H02G 11/02
(52) U.S. Cl. ................... 254/284; 114/254; 191/12.2 A
(58) Field of Search ................................ 254/417, 284, 254/278, 292, 316, 134.35 L, 135.3 CC; 244/1 TD; 191/12.2 R, 12.2 A; 114/244, 254

(56) References Cited

U.S. PATENT DOCUMENTS

| | | | | | |
|---|---|---|---|---|---|
| 2,030,128 | A | * | 2/1936 | Webster | 294/81.6 |
| 691,817 | A | | 5/1953 | Baker et al. | |
| 3,858,845 | A | | 1/1975 | Grote et al. | |
| 3,973,656 | A | | 8/1976 | Zumbro | |
| 4,217,066 | A | * | 8/1980 | Gunther | 405/185 |
| 4,250,351 | A | | 2/1981 | Bridges | |
| 4,384,688 | A | | 5/1983 | Smith | |
| 4,659,276 | A | | 4/1987 | Billett | |
| 4,730,677 | A | * | 3/1988 | Pearce et al. | 166/345 |
| 5,044,826 | A | * | 9/1991 | Forster | 405/169 |
| 5,230,588 | A | * | 7/1993 | Wittke et al. | 405/191 |
| 5,240,092 | A | | 8/1993 | Eachus | |
| 5,727,373 | A | * | 3/1998 | Appleford et al. | 57/1 UN |
| 6,267,356 | B1 | | 7/2001 | Crawford | |

FOREIGN PATENT DOCUMENTS

| | | |
|---|---|---|
| CH | A 473 047 | 5/1969 |
| DE | C 643 817 | 4/1937 |
| DE | 908 876 | 3/1964 |
| DE | A 23 50 352 | 4/1975 |
| DE | A 37 41 192 | 6/1989 |
| DE | U 9403464.8 | 4/1994 |
| FR | 2519181 A1 | 7/1983 |
| GB | 691817 | 5/1953 |
| SU | 493 845 | 3/1976 |
| SU | 609 159 | 5/1978 |
| WO | WO 96/22935 | 8/1996 |

OTHER PUBLICATIONS

Crawford, Moya, A Railroad to the Seabed, Bridge Newsletter No. 12, Published by the University of Leeds in the United Kingdom, Spring 1997, pp 4–7.

Work Starts on Final Link in the £40m Network, Torch 5 Newsletter, Published in the United Kingdom by Torch Telecom, Nov. 1994.

* cited by examiner

*Primary Examiner*—Thomas J. Brahan
(74) *Attorney, Agent, or Firm*—Blackwell Sanders Peper Martin, LLP

(57) ABSTRACT

An apparatus and a method for use in handling a load includes a load-bearing rope, and a mechanism for paying out and recovering the rope. There is also a drum for holding a service cable with a length of the service cable extending from the drum. A wrapping device rotates the length of service cable around the rope as the rope is payed out to wrap the service cable around the rope, and to unwrap the service cable from the rope as the rope is recovered.

23 Claims, 26 Drawing Sheets

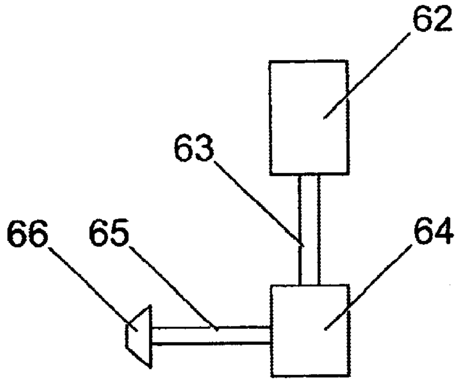
Fig. 8d
Fig. 8c
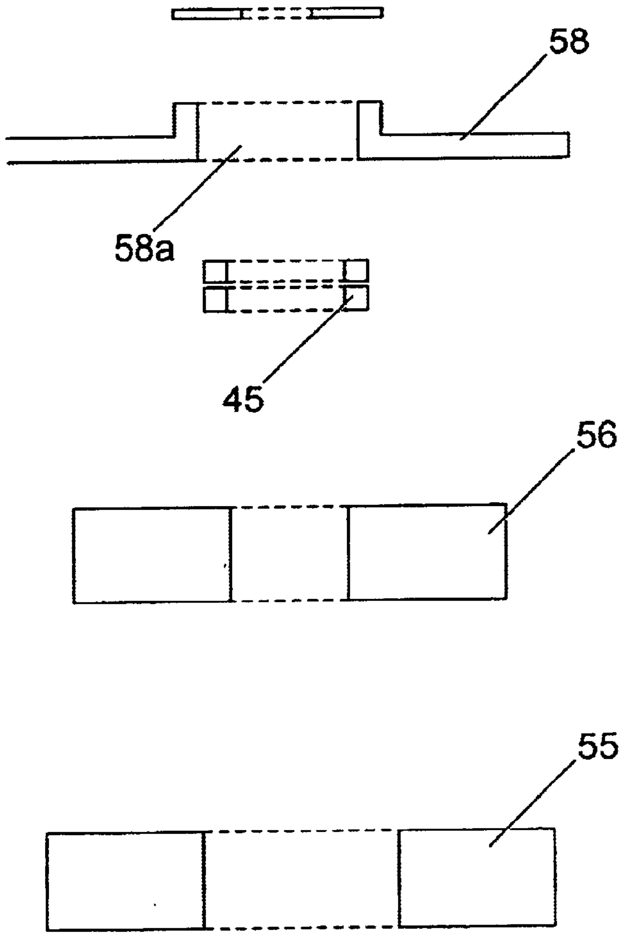

APPARATUS AND METHOD FOR USE IN HANDLING A LOAD

This is a continuation of application Ser. No. 09/274,259, filed Mar. 22, 1999, now U.S. Pat. No. 6,267,356.

BACKGROUND OF THE INVENTION

This invention relates to apparatus for use in handling a load which is capable of raising and lowering, or of towing, a load and also handling service cables and/or hoses connected to the load. The invention is particularly, but not exclusively, applicable to the handling of subsea equipment such as grabs.

Hitherto, providing services to underwater equipment has required the provision of a specific bundle of cable(s) and/or hose(s) dedicated to each application. For some applications, it is known to incorporate the service bundle within an armored hoist rope. This approach has a number of deficiencies. The resulting rope is costly, gives inferior hoisting properties, and by virtue of limitations on the diameter of rope which can be handled the services which can be incorporated are limited. Further, in practice it is impossible with this arrangement to add to the length of the rope or to join different types of materials, for example wire ropes with fiber ropes.

It is also known from our previous application PCT/GB96/00158 to wrap service cable around a rope being paid out, and to unwrap the service cable from the rope as the rope is recovered.

BRIEF SUMMARY OF THE INVENTION

According to the present invention there is provided apparatus for use in handling a load comprising a load-bearing rope, a mechanism for paying out and recovering the rope, a first service cable holder for holding a first service cable with a length of the first service cable extending therefrom, a second service cable holder for holding a second service cable with a length of the second service cable extending therefrom, and a wrapping device for rotating said lengths of service cable around the rope as the rope is payed out to wrap the service cables around the rope, wherein one of the first and second service cables is wrapped over the other.

The service cable holders can be drums.

Typically the wrapping device can recover the service cables to their respective drums during recovery of the rope and cables.

The term "service cable" is used herein to denote a flexible elongate member used for conveying power or data, such as an electrical cable, a fiber optic cable, or a pneumatic or hydraulic hose.

Preferably, the service cables are wrapped helically around the rope.

Typically, the load-bearing rope will be a hoist rope used for raising and lowering a load. Alternatively, the load-bearing rope may be a towing rope used for paying out, towing and recovering a load such as a marine sensor array.

Preferably, the mechanism for paying out and recovering the rope comprises a rope winch, from which the rope passes over a rope sheave and thereafter extends to the load along a substantially straight axis.

The wrapping device may comprise the or each service cable drum being arranged for rotation about a drum axis which coincides with said axis, the drum typically having a central aperture through which the load-bearing rope passes, said length of service cable preferably passing over a service cable sheave which is mounted for movement in a circular path around said axis.

Alternatively, the or each service cable drum may be rotatable on a structural member which is arranged for movement in a circular path about said axis.

The hoist rope winch, the or each service cable drum, and the wrapping device may conveniently each have a respective driving motor; they could however be driven by a single source through appropriate mechanical linkages.

The first and second cables are typically wrapped around the rope in different directions; for example, the first cable can be wrapped onto the rope in an anticlockwise direction and the second cable can be wrapped around the rope in a clockwise direction so that one cable overlays the other. This option is to be preferred but the invention can also work well with the service cables being wrapped in the same direction but at different pitches of helix, so that one overwraps the other.

The invention also provides apparatus for use in handling a load comprises a load-bearing rope, a mechanism for paying out and recovering the rope, a mechanism for holding and paying out a service cable and a wrapping device for rotating one of the service cable and the rope around the other as they are payed out to wrap the said one of the service cable and the rope around the other, and to unwrap one of the service cable and the rope from the other as it is recovered, wherein at least part of the wrapping device can be moved to accommodate large objects.

In a preferred embodiment the service cable is provided on drum which is mounted on an arm which rotates around the axis of the rope. The drum can be arranged to rotate about a horizontal or a vertical axis.

The service cable holder is preferably mounted on an arm that is preferably hinged to a frame and can be provided with a lifting mechanism such as a hydraulic ram to lift the arm with respect to the frame. Instead of a hydraulic ram the lifting mechanism may be a screw-driven mechanism which can be electrically or hydraulically powered.

The invention also provides apparatus for use in handling a load comprising a load-bearing rope, a mechanism for paying out and recovering the rope, a drum for holding a service cable with a length of the service cable extending therefrom, and a wrapping device for rotating said length of service cable around the rope as the rope is payed out to wrap the service cable around the rope, and to unwrap the service cable from the rope as the rope is recovered, wherein the wrapping device rotates around the axis of the rope, but does not rotate about its own axis.

The invention also provides apparatus for use in handling a load comprising a load-bearing rope, a mechanism for paying out and recovering the rope, a cable holder for holding a service cable with a length of the service cable extending therefrom, and a wrapping device for rotating said length of service cable around the rope as the rope is payed out to wrap the service cable around the rope, and having at least one slot to facilitate attachment of the apparatus to the load-bearing rope.

The invention also provides a method for use in handling a load, the method, comprising paying out a load-bearing rope and wrapping first and second service cables around the rope as it is payed out, and subsequently unwrapping the service cable from the rope as the rope is recovered, wherein one of the service cables is wrapped over the other.

BRIEF DESCRIPTION OF THE DRAWINGS

Examples of apparatus and a method for use in handling a load in accordance with the invention will now be described with reference to the drawings, in which:

FIG. 8*c* shows in side sectional view some of the components of the fifth embodiment;

FIG. 8*d* shows a further component of the fifth embodiment;

DETAILED DESCRIPTION OF THE INVENTION

Figure 1:
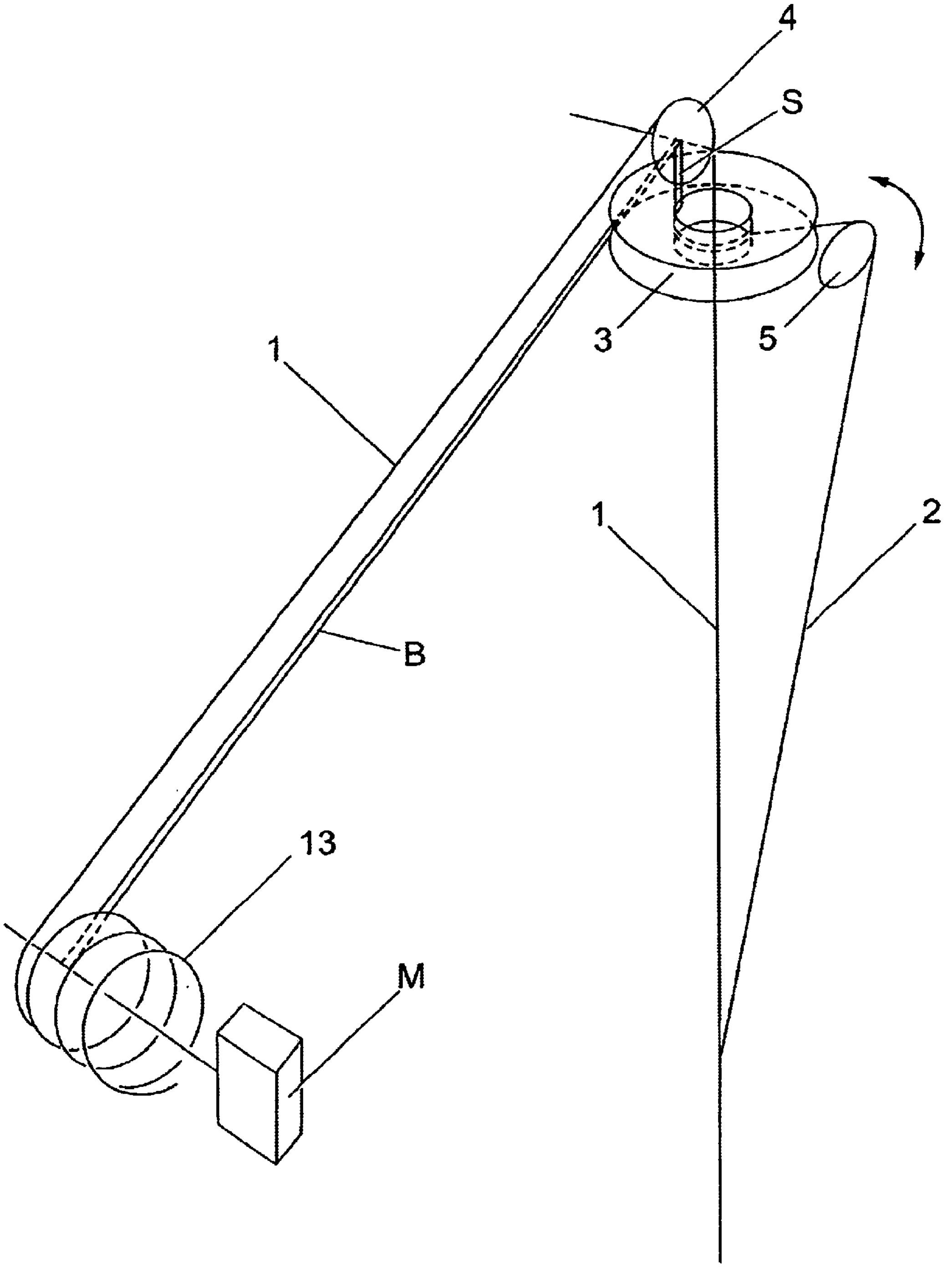
FIG. 1 is a schematic perspective view illustrating the principle of operation of a first winding device.
Figure 2:
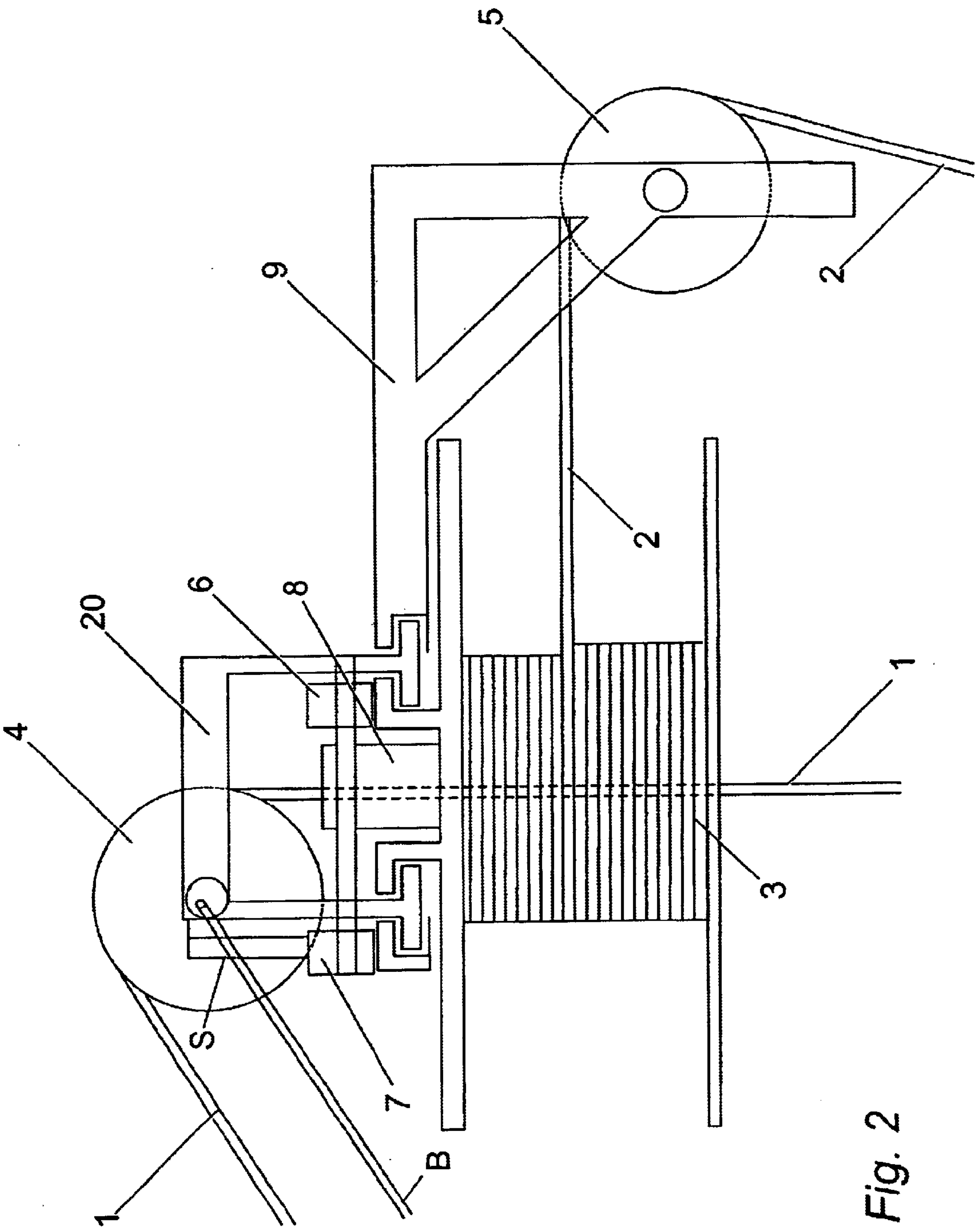
FIG. 2 is a more detailed side view, partly in section, of an apparatus used in the example of FIG. 1.

FIGS. 1 and 2 show an optional mechanical linkage in the form of belt B linking the shaft of the rope winch 13 to a spur gear S on the rope sheave 4. A motor M drives the rope winch 13 and transmits power via the mechanical linkages of the belt B and spur gear S to the motor 7. The motor 7 can optionally be linked to the motor 6 so that the rope winch motor M can be used to drive the winch, service cable drum and the rotation of the service cable sheave 5 to wrap the service cable 2 around the rope 1.

Referring to FIG. 1, a hoist rope 1 extends from a hoist rope winch 13 over a hoist rope sheave 4 to support a load (not shown) for raising and lowering. The hoist rope 1 may be any suitable form of hoist rope such as flexible steel wire rope or synthetic fiber rope, for example of "KEVLAR®". KEVLAR(® is a registered trademark of E. I. du Pont de Nemours and Company, which is a Delaware corporation having a place of business at 1007 Market Street, Wilmington, Del. 19898. A service cable 2 is reeled on a service cable drum 3 and extends to the load via a service cable sheave 5.

The hoist rope 1 passes through a central aperture of the service cable drum 3, and the service cable sheave 5 is arranged to be driven circumferentially around the axis of the service cable 1. By coordinating the movements of the hoist rope winch 13, the service cable drum 3 and the service cable sheave 5, the service cable 2 can be wrapped helically around the hoist rope 1 as the load is lowered, and unwrapped as the load is raised. In this way, a hoist rope of any desired properties can be used in combination with any required service connection.

Further, service cables on other drums can be added to be rotated by a motor in different directions.

FIG. 2 shows the service cable drum 3 and associated parts in greater detail. The hoist rope sheave 4 is journalled to a fixed frame 20 which is secured to any suitable supporting structure (not shown). The service cable drum 3 is rotatably mounted on the lower part of the frame 20 and driven in rotation by a motor 6.

The inner end of the service cable 2 is connected to the appropriate service by a coupling assembly 8 which includes a slip ring arrangement in the case of electrical or fiber optic services or a rotary coupling in the case of pneumatic or hydraulic services; such rotary couplings are well known per se.

The service cable sheave 5 is joumalled on a mounting frame 9 which is rotatable about the fixed frame 20 by means of a motor 7.

The service cable 2 shown in this embodiment may be a single cable or hose, or may be a specially made cable comprising a plurality of cable(s)/hose(s).

The motors 6 and 7 are driven at speeds related to the axial speed of the hoist rope 1. The speed correlation may be fixed. Preferably, however, this correlation will be controllable to alter both the length of twist (pitch) of the lay of the service cable 2 on the hoist rope 1, and the tension in the service cable 2.

Figure 3:
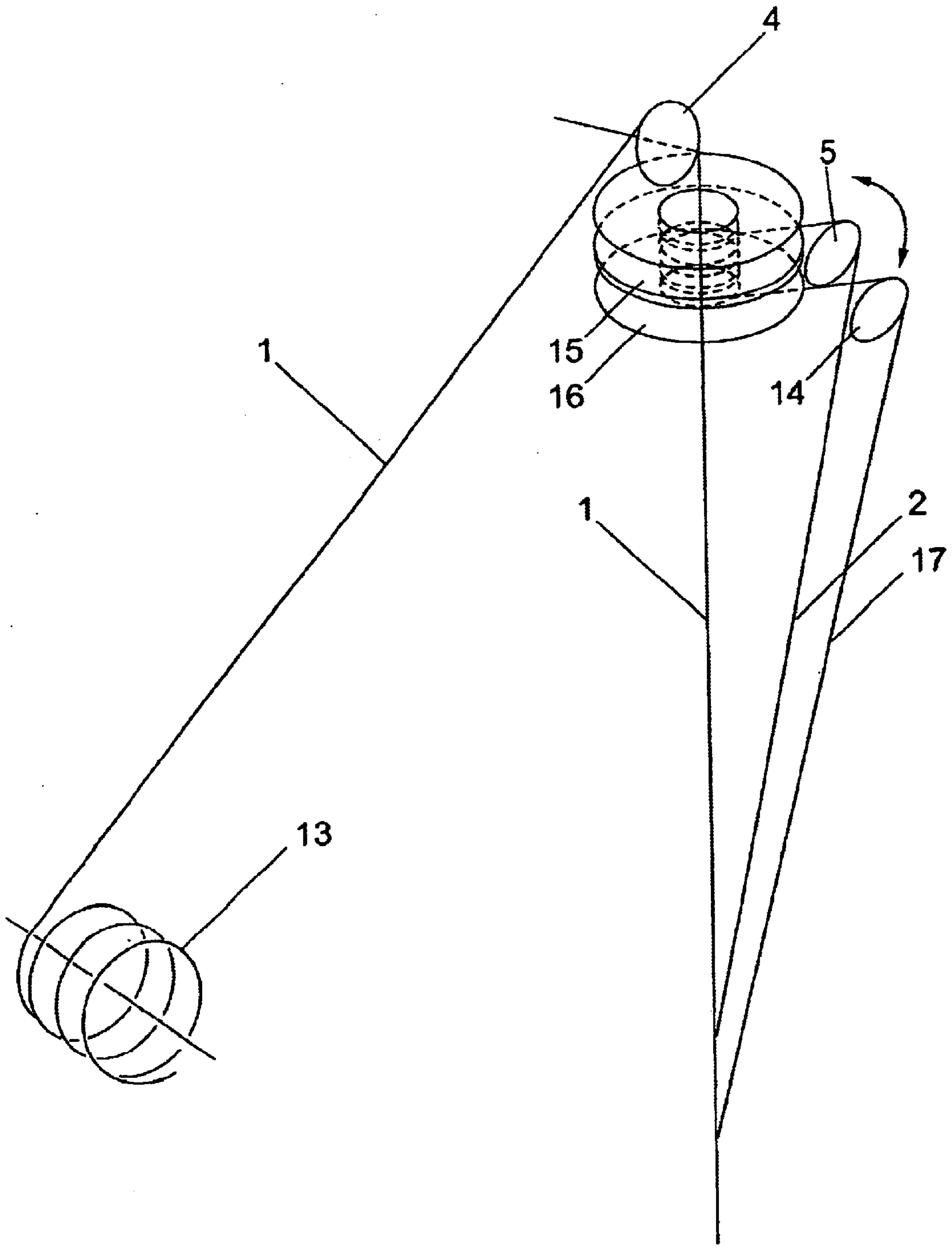
FIG. 3 is a view similar to FIG. 1 illustrating a modification of the arrangement of FIG. 1.

FIG. 3 shows a modification in which a second service cable 17 is wrapped on the hoist rope 1 along with the service cable 2. In this modification, the service cables 2, 17 are each provided with a respective storage drum 15, 16 and a respective sheave 5, 14, e.g., drum, which may suitably be carried on a common supporting frame for rotation in unison. The drum 14 revolves in an opposite direction to the drum 5 around the rope's axis, so that the second service cable 17 is wrapped around the hoist rope 1 in the opposite direction to that of the service cable 2.

The apparatus may be further modified by adding further drums and sheaves to handle more services. At least one service cable is overwrapped on the others, and this is preferably the last one to be applied so that the overwrapping cable is at the outer surface of the wrapped assembly.

Figure 4:
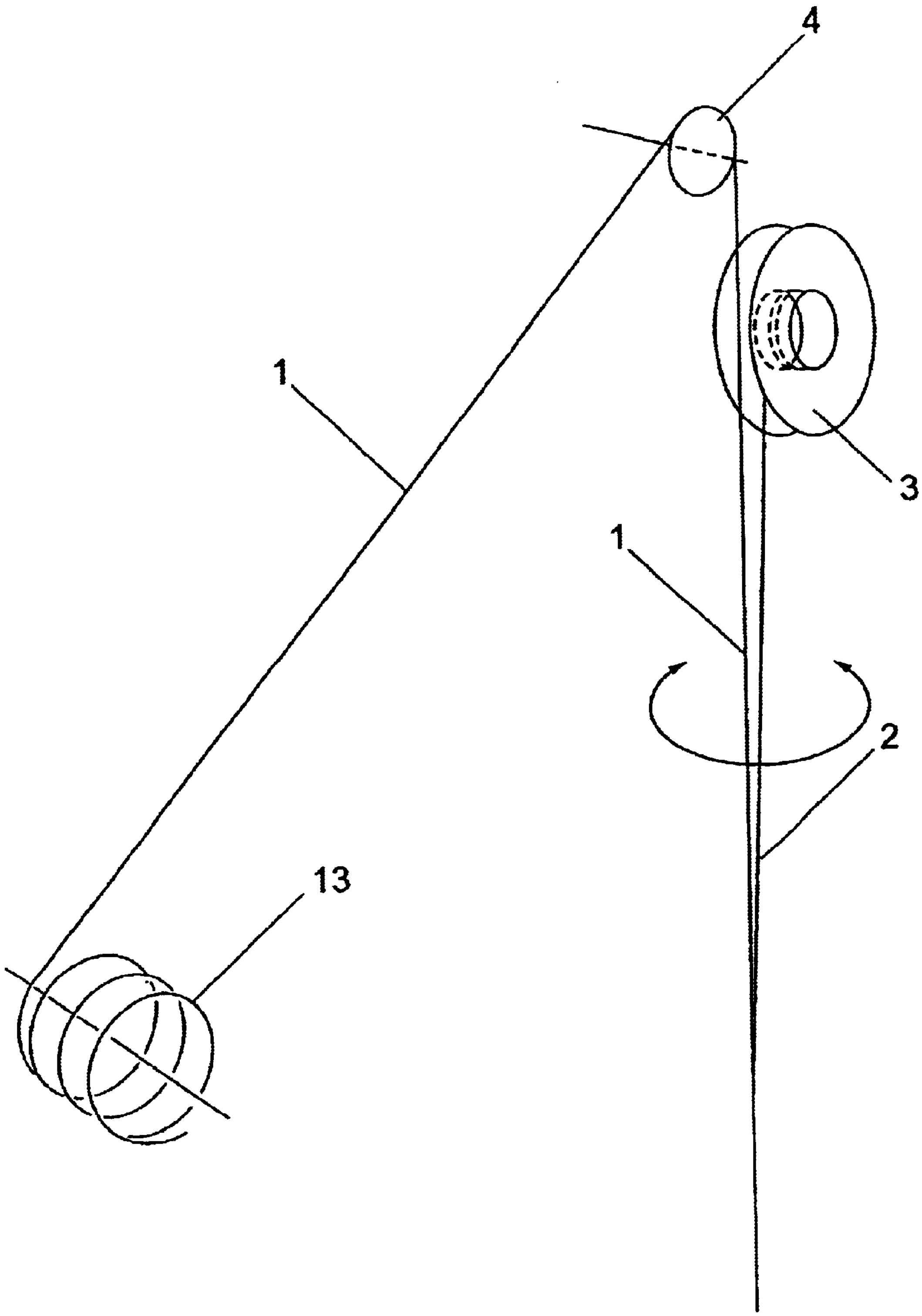
FIG. 4 is a schematic perspective view illustrating a second example.

FIG. 4 illustrates a second example in which the service cable 2 is reeled on a service cable drum 3 and the service cable drum 3 is itself rotated about the hoist rope 1 to achieve a helical wrap and unwrap. As shown in more detail in FIG. 5, the service cable drum 3 may be constituted by a drum 12 removably mounted on a hub motor 11 which is carried on the end of an arm 18 rotatably mounted on the fixed frame 20 and driven by a motor 10.

Figure 5:
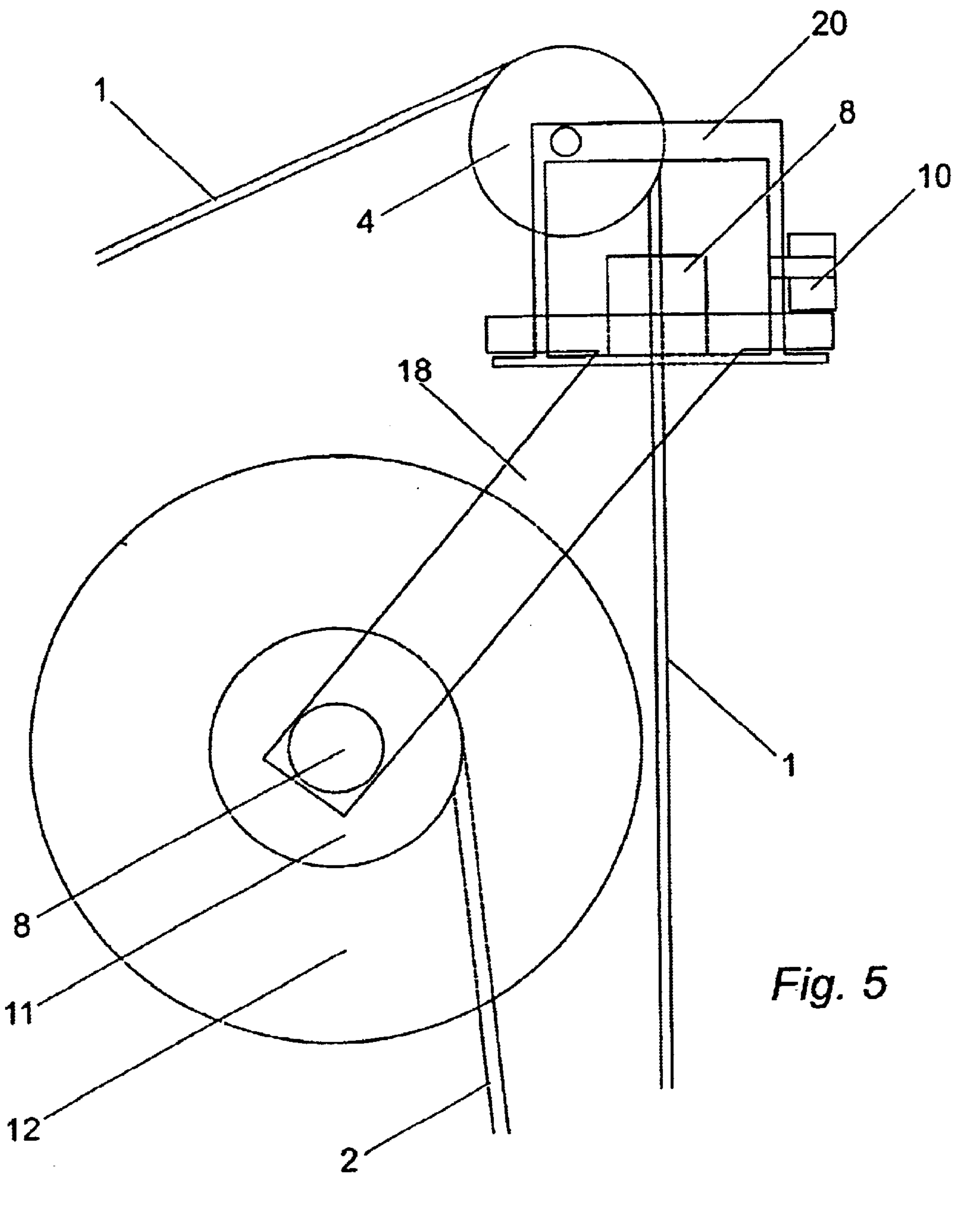
FIG. 5 is a side view of an apparatus used in the example of FIG. 4.

As with the first example, the example shown in FIGS. 4 and 5 could be modified by adding further service cable drums to be rotated by the motor 10 in the opposite direction to the first cable and drum so as to overwrap the second cable on top of the first.

Figure 6:
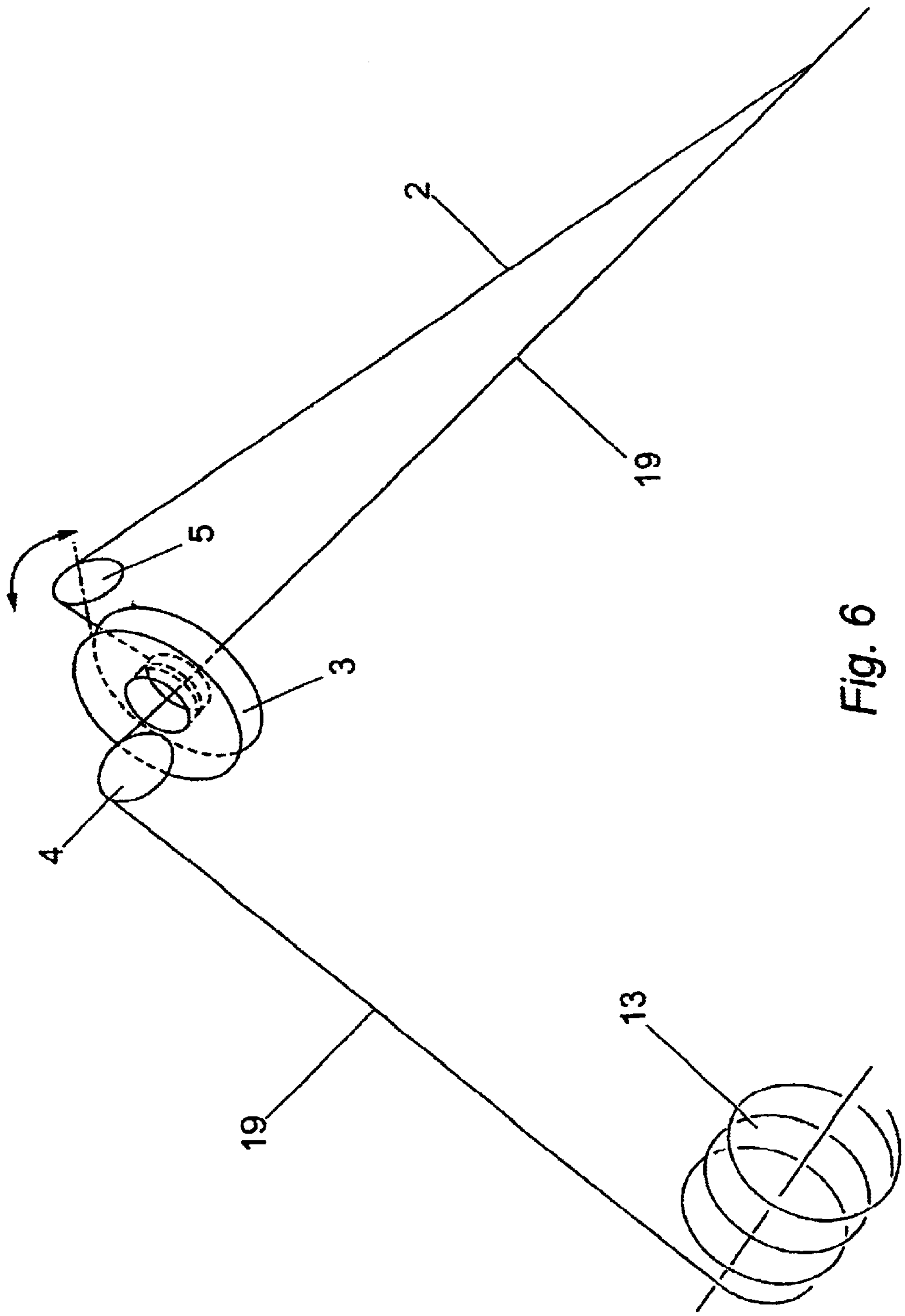
FIG. 6 is a schematic perspective view illustrating a third example similar to that of FIG. 1 but modified for towing rather than lifting.
Figure 7:
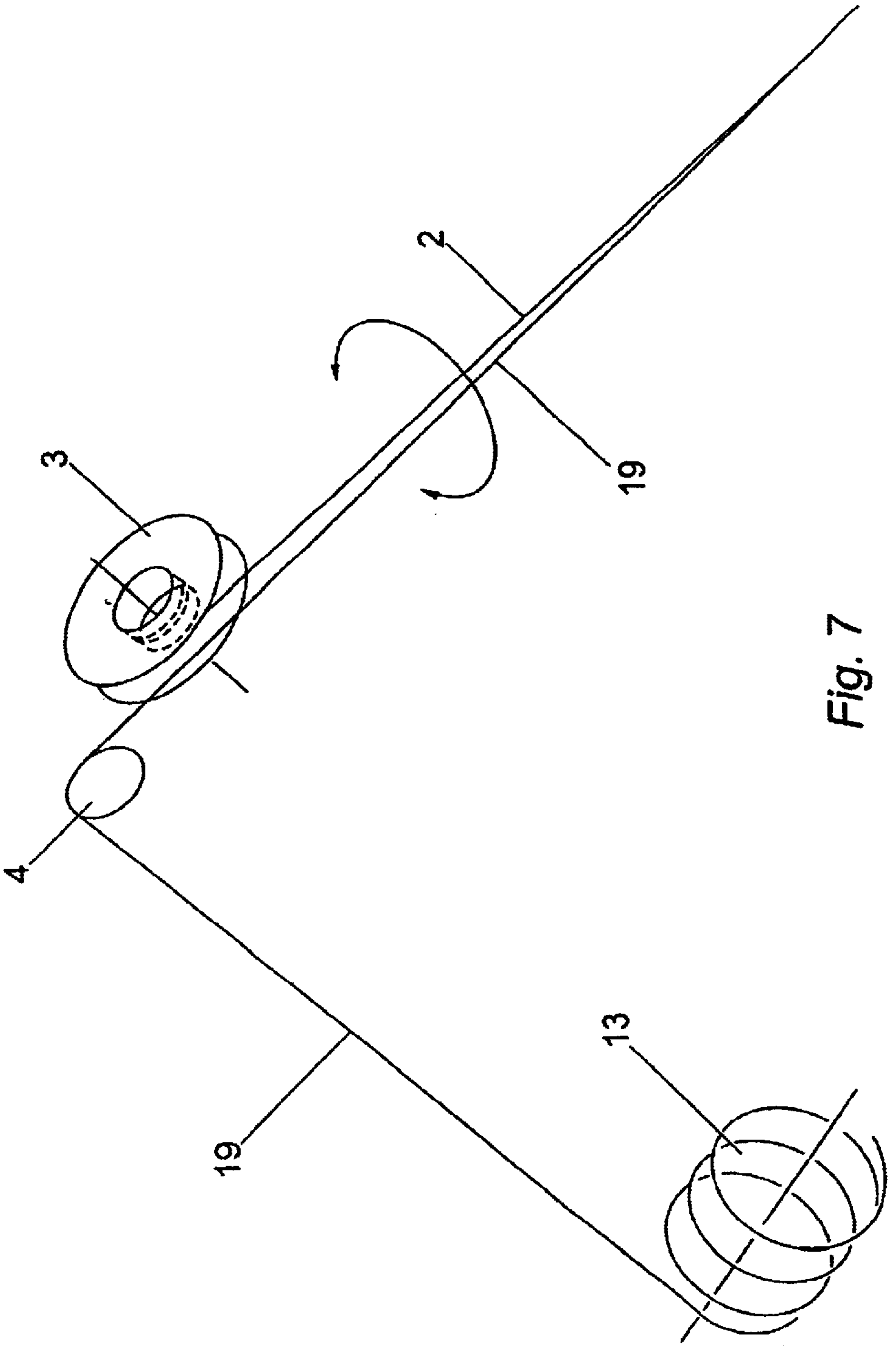
FIG. 7 illustrates a fourth example similar to that of FIG. 4 but modified for towing rather than lifting.

FIG. 6 illustrates the example of FIG. 1 modified for use in a marine towing application, for example in paying out, towing and recovering a sensor array such as a sonar sensor or seismographic surveying sensor, the sensor array being towed underwater or on the surface. The service cable drum 3 is hinged to the main structure of the towing vessel (not shown) and can be tilted to a desired towing angle by hydraulic or other mechanisms. Likewise, FIG. 7 illustrates the modification of the example of FIG. 4 for the same use, the frame carrying the mounting arm for the service cable drum 3 being hinged to the vessel and tilted to the desired angle by hydraulic or other mechanisms.

The invention may be applied to a system in which one or more service cables is applied to a load-bearing rope which itself carries a service channel in addition to fulfilling its load-bearing function. For example, the load-bearing rope could be a steel wire rope carrying electrical signals, or a rope comprising KEVLAR® load-bearing strands in combination with optical fiber cable.

Figure 8A:
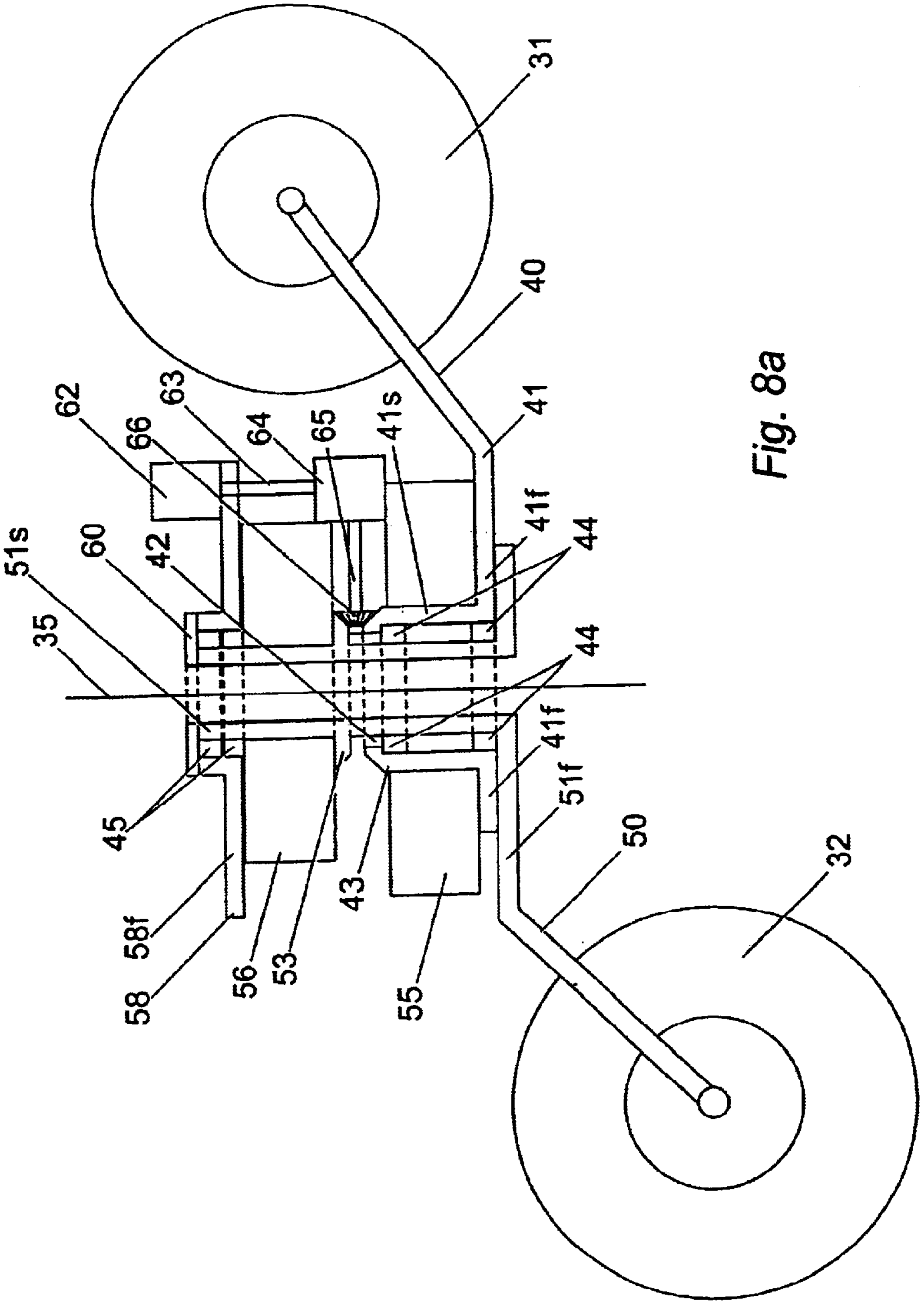
FIG. 8*a* is a schematic side view of a fifth embodiment.
Figure 8B:
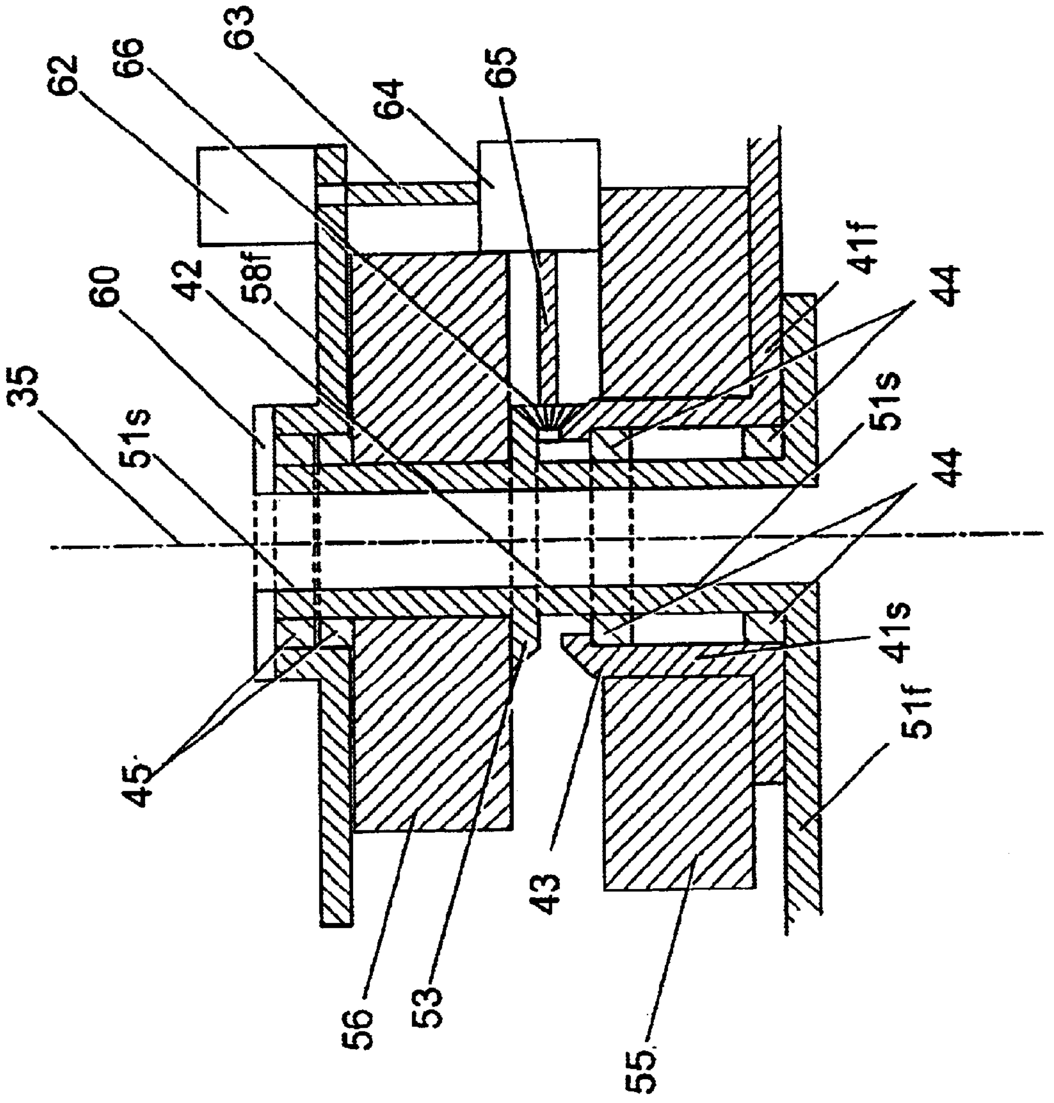
FIG. 8*b* is a close up view of the FIG. 8*a* embodiment.

FIG. 8 discloses a further embodiment of the invention having first and second drums 31 and 32 which are arranged to rotate around a load-bearing rope 35 in different directions and can wind different cables (for example a fiber optic communications cable and a high voltage power cable) in opposite directions around the central load-bearing rope 35. This has been found by the inventor to be useful particularly in applications where the load-bearing rope 35 remains slack during certain periods in the operation of the equipment. By contra-rotating the cables around the load-bearing rope they are less likely to move or become loose should the load-bearing rope 35 slacken. In addition, a fragile cable such as a fiber optic cable wound around the load-bearing rope 35 in a first direction can be overlaid by e.g., a high voltage power cable wound around the load-bearing rope 35 and fiber optic cable in the opposite direction, and this can also afford some protection to fragile cables such as fiber optics etc.

In the FIG. 8 apparatus, two different cables wound onto the respective drums 31 and 32 are paid out while the drums are rotated around the load-bearing rope 35.

Figure 9A:
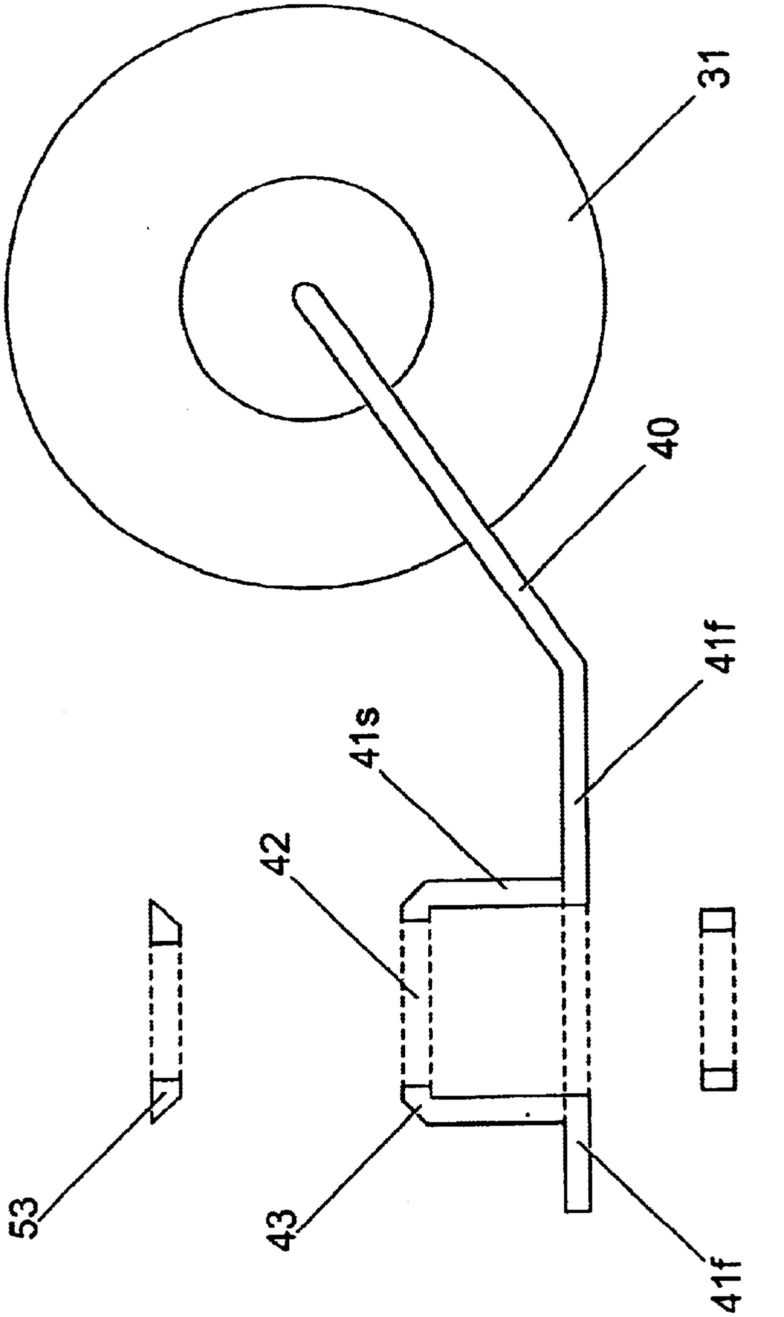
FIG. 9*a* shows a side sectional view of an arm assembly of the fifth embodiment.

The drum 31 is mounted on an arm 40 connected to an arm assembly 41 having a top hat structure with a top surface, and an annular flange 41*f* provided at the lower end of side walls 41*s* (shown in FIG. 9*a*). The arm assembly 41 has a central aperture 42 in its top surface through which the load-bearing rope 35 passes, and has an annular bevel gear 43 cut into the outer edge of its top surface.

Figure 9B:
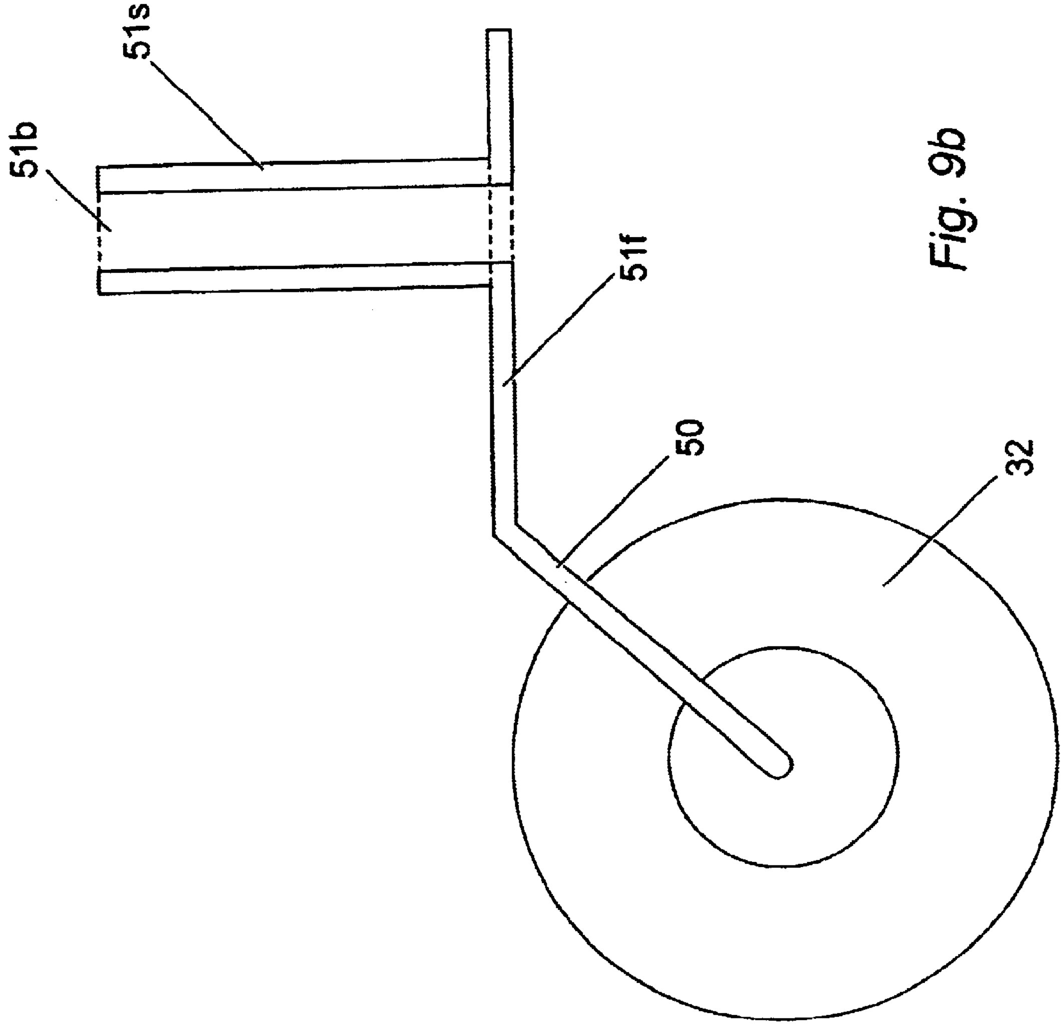
FIG. 9*b* shows a side sectional view of a further arm assembly of the fifth embodiment.
Figures 10A, 10B:
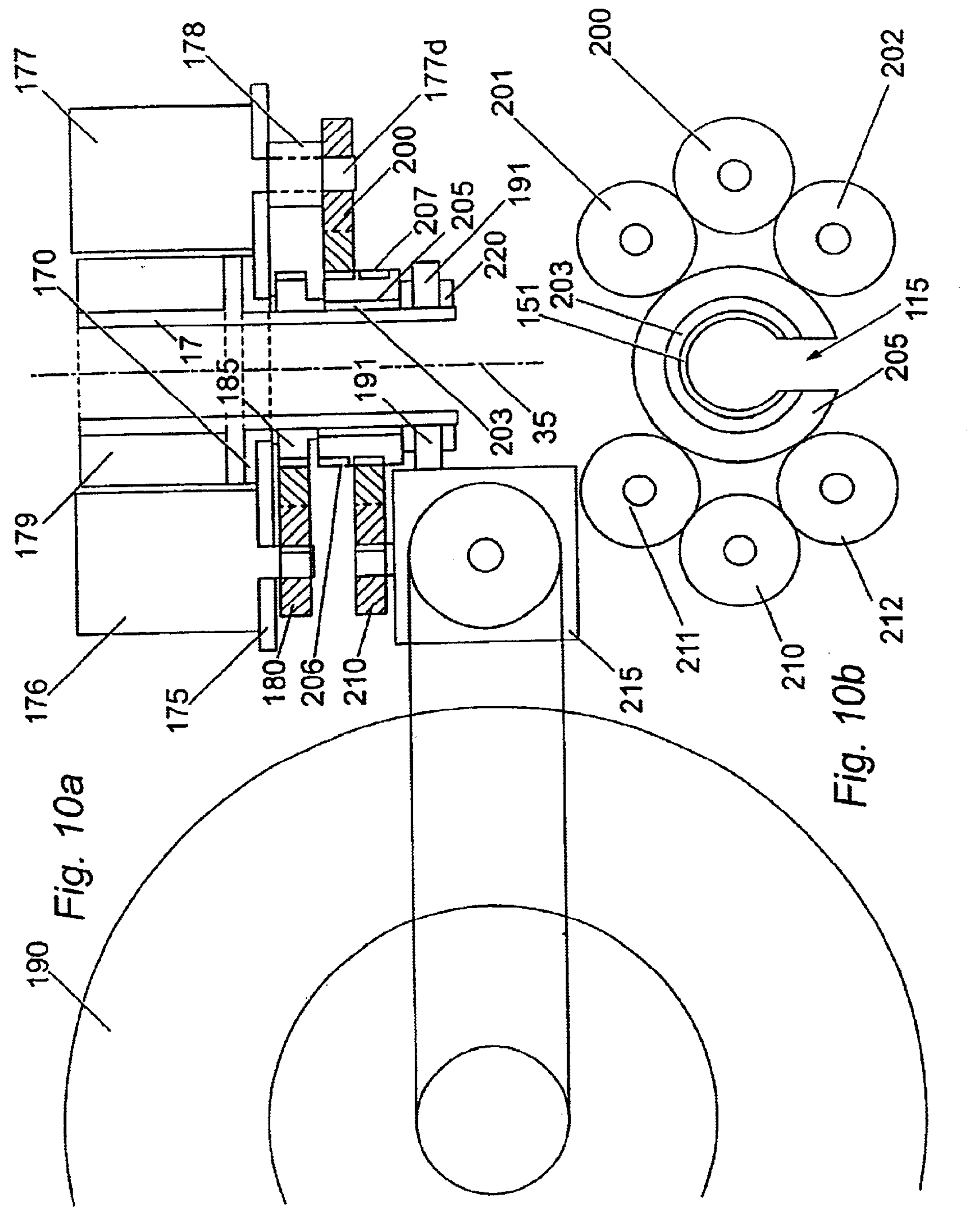
FIGS. 10*a* and 10*b* show a side and top view respectively of a sixth embodiment.
Figure 11:
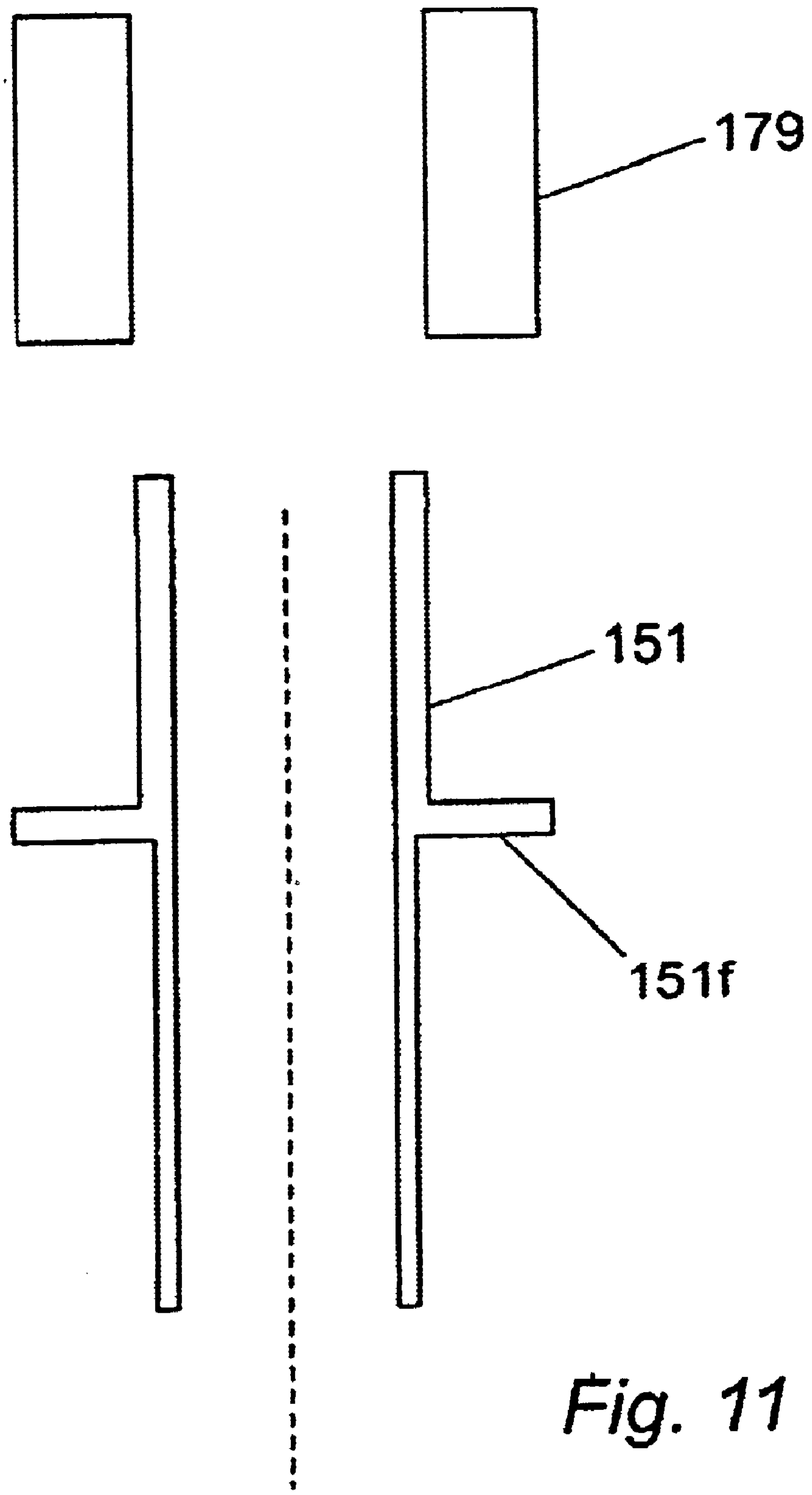
FIG. 11 shows a side view of a sleeve and bearing of the sixth embodiment.
Figure 12:
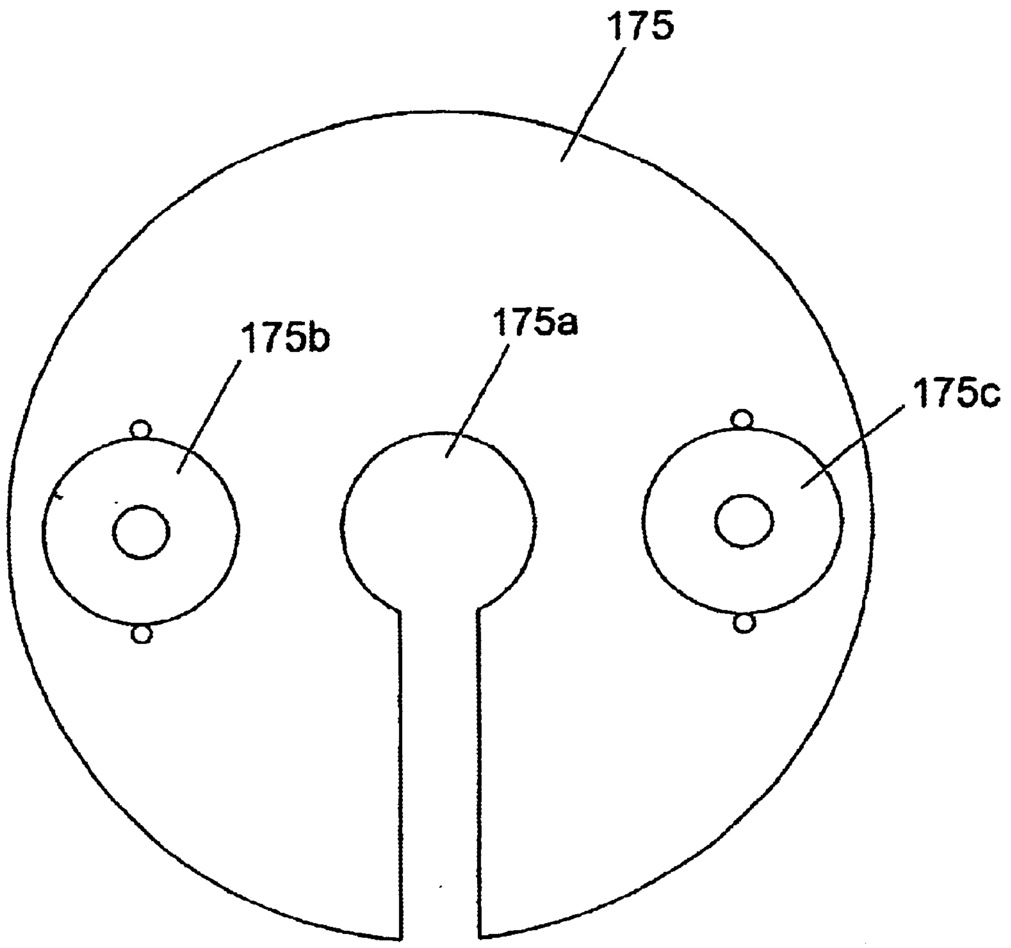
FIG. 12 shows a plan view of a main support plate of the sixth embodiment.
Figure 13A:
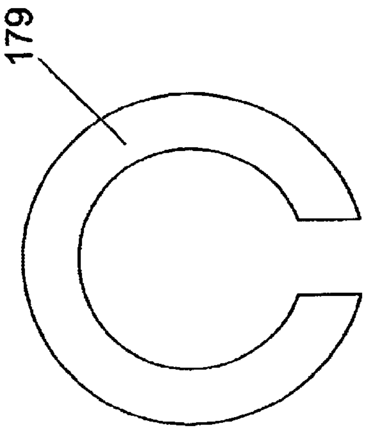
FIGS. 13*a* and 13*b* show plan views of bearings used in the sixth embodiment.
Figure 13B:
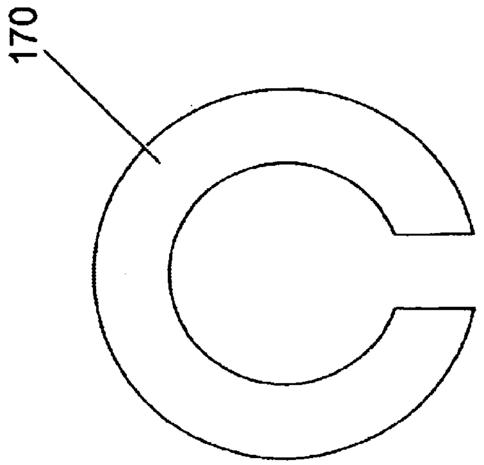
Figure 14A:
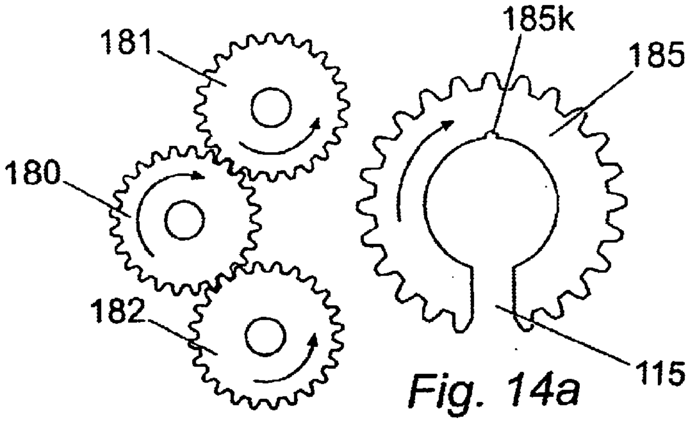
FIGS. 14*a*, 14*b* and 14*c* show plan views of gears used in the sixth embodiment.
Figure 14C:
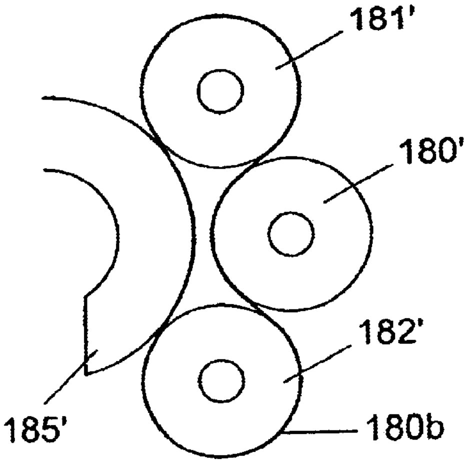
Figure 14B:
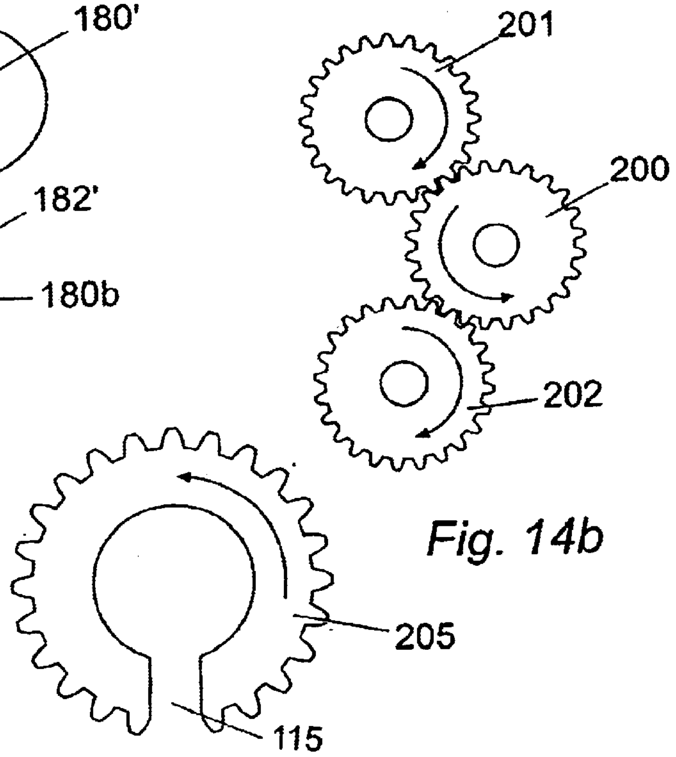
Figures 15A, 15B, 15C:
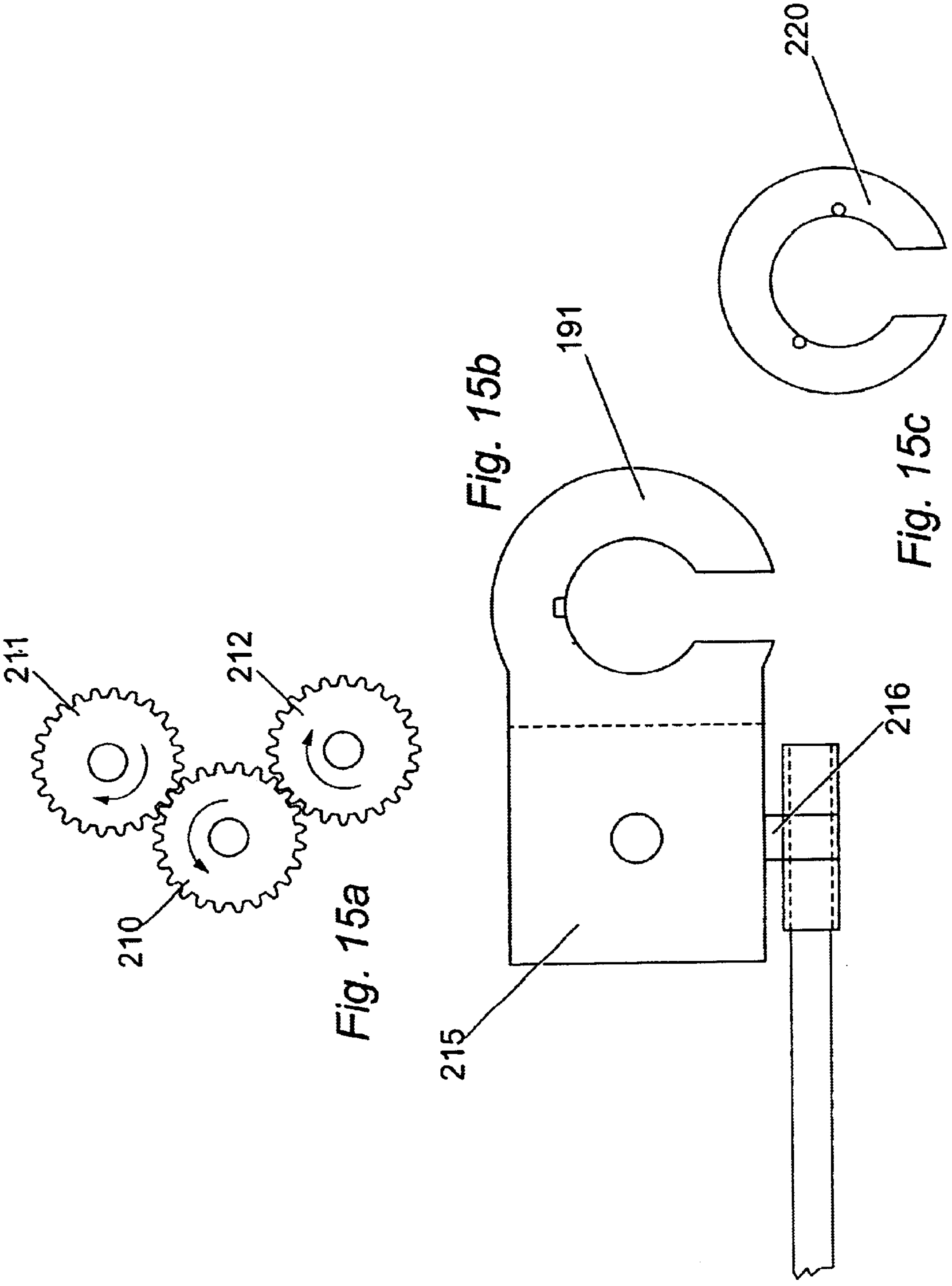
FIGS. 15*a*, 15*b* and 15*c* show plan views of further gears used in the sixth embodiment.
Figure 16:
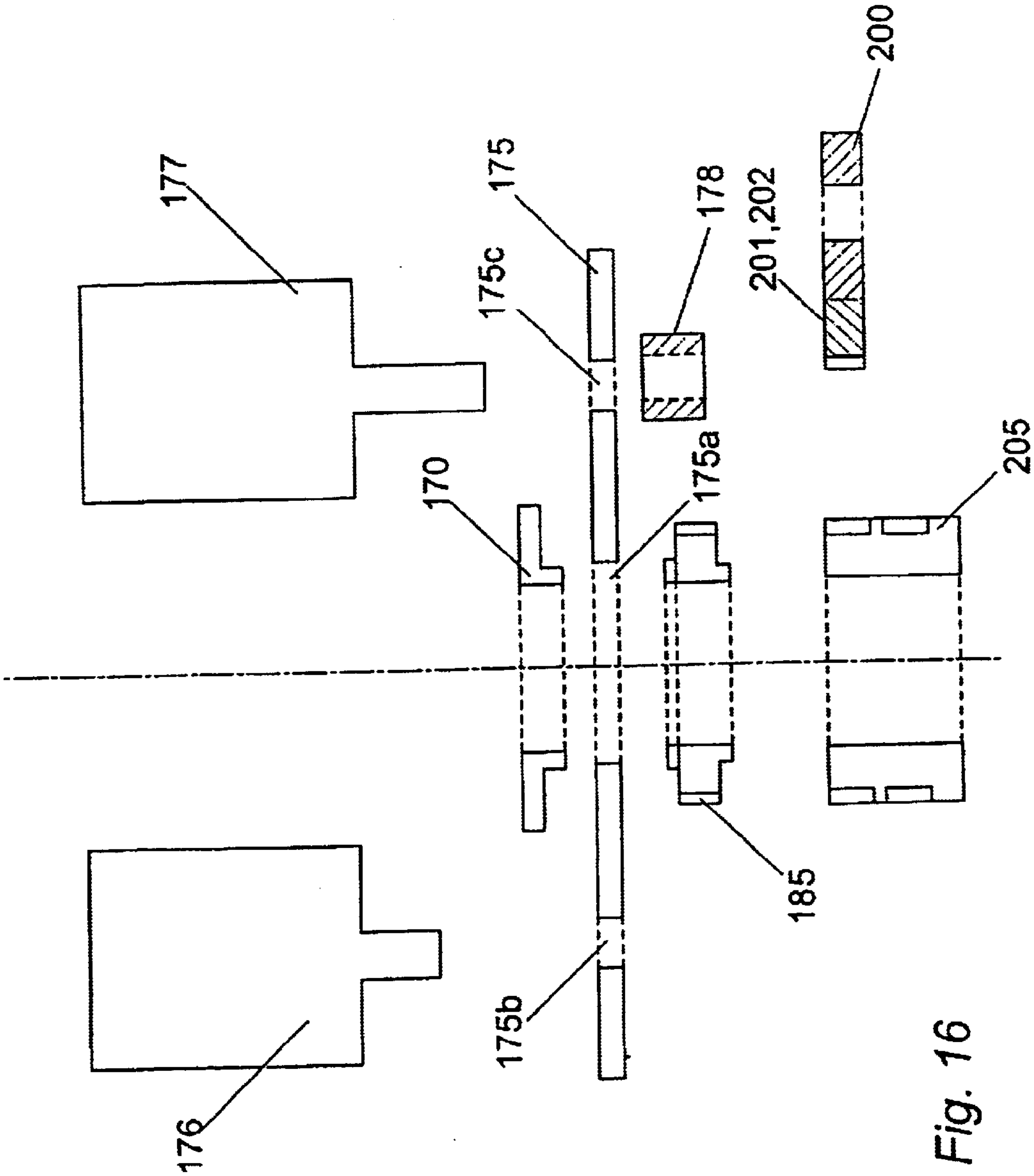
FIG. 16 shows an exploded side view of the drive train in the sixth embodiment.
Figure 17:
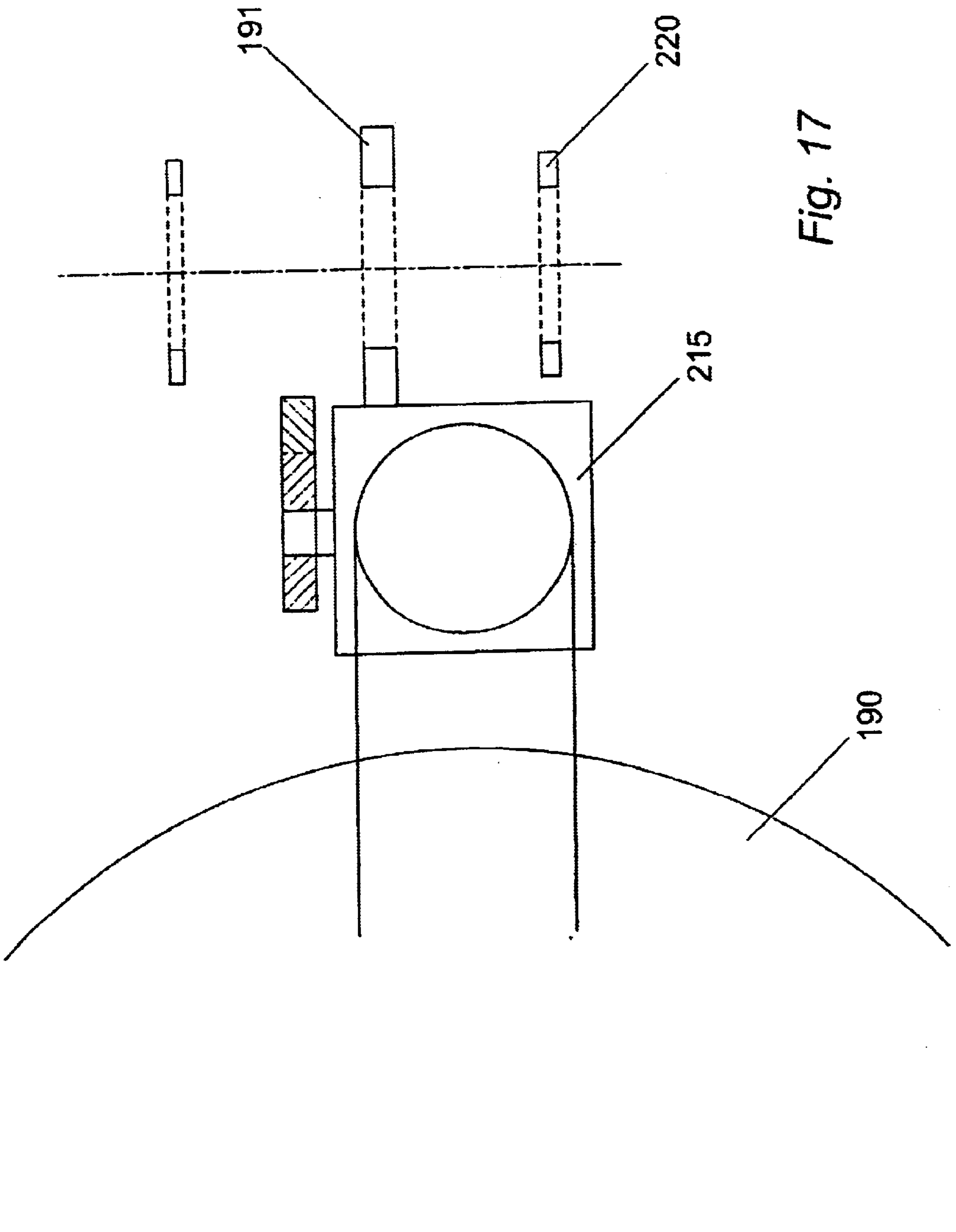
FIG. 17 shows a side view of a gearbox of the sixth embodiment.

The second drum 32 is supported on a further arm 50 also connected to an arm assembly 51 having a similar top hat structure and shown in FIG. 9*b*. Arm assembly 51 comprises a lower annular flange 51*f* with a sleeve 51*s* attached thereto and having a central bore 51*b* extending through the sleeve 51*s* and through the annular flange 51*f*. A bevel gear 53 (shown in FIG. 9*a*) is manufactured separately but located over the sleeve 51*s* and fixed in place by any suitable means, for example by welding or bolting or other fixing means after the apparatus has been assembled.

The FIG. 8 apparatus is assembled by locating the arm assembly 41 and a pair of bearing rings 44 over the sleeve 51*s*, so that the arm assembly 41 is capable of rotating on the bearings around the sleeve 51*s*. A slip ring 55 for transmitting electric or hydraulic power via the rotating arm assembly 41 and arm 40 to the drum 31 is then located over the ring 41 to rest on the flange 41*f*. Slip rings suitable for this and other purposes of the invention are known and suitable electrical, fiber optic and fluid rotary union slip rings are available, e.g., from Focal Technologies Inc. of 40 Thornhill Drive, Unit 7 Dartmouth, Nova Scotia, Canada B3B 1S1. Such slip rings for electrical, fiber optic and hydraulic power transmission are clearly readily available and will not be described further here.

The bevel gear 53 is then offered to the sleeve 51*s* and attached thereto in opposite orientation to bevel gear 43. A further slip ring 56 is located on top of the bevel gear 53 in order to transmit power from a stationary source via the sleeve 51*s*, flange 51*f* and arm 50 to the drum 32.

Bearing rings 45 are then located over the sleeve 51*s* and a support bracket 58 is placed around them and attached to the ship or other structure from which the apparatus is to be used. The support bracket 58 likewise has an annular flange 58*f* and an aperture 58*a* for the sleeve 51*s*. A top ring 60 having a central aperture for the through passage of the rope 35 is then bolted to the upper face of the sleeve 51*s*, and secures the annular apparatus together around the central sleeve 51*s*.

On the flange 58*f* of the support bracket 58, a motor 62 drives a shaft 63 to a gearbox 64 disposed below the support bracket 58 but above the lower slip ring 55. The motor 62 and the gearbox 64 transmit power via shaft 65 between the slip rings to a bevel gear drivehead 66. The bevel drivehead 66 engages the bevel gears 53 and 43 and drives them in opposite directions simultaneously. By a single force exerted from the motor 62, the arms 40 and 50 and therefore the drums 31 and 32 can thus be driven in opposite contra-rotating directions around the central axis of the load-bearing rope 35 as it is payed out (described previously).

The bearings 44, 45 support the arm assemblies 41 and 51 so that they can rotate within the main support bracket 58 attached to the ship or other structure.

The winch drums 31 and 32 can hoist and lower cables by use of electric or hydraulic power transmitted through the slip rings 55, 56. Conventional power cables (or hydraulic conduits if hydraulic motors are used) can be passed through the drum support arms 40 and 50 from the inner half of the slip ring adapters which will remain stationary in relation to the arms 40, 50.

Although the embodiment shown in FIGS. 8 & 9 is driven through the motor 62 and the bevel drivehead 66, the apparatus could also be driven from the sleeve 51*s* which could in certain embodiments protrude out of the securing plate and be rotated using belts, gears, chains or similar mechanisms. The bevel gear arrangement shown in FIGS. 8 & 9 would in that embodiment still remain to contra-rotate the drums under the power applied to the sleeve 51*s* and therefore the bevel gear 53.

The drums 31, 32 could also be driven independently using two separate motors. One motor at the top of the sleeve 51*s* as mentioned above could drive the arm 50, and the motor 62 could drive the arm assembly 41 through the bevel drivehead 66. That embodiment would not require the additional bevel gear 53, which could be removed.

A further improved variant of the invention is shown in the remaining FIGS. 10 to 17. Components of the mechanism shown in these figures are slotted so that the apparatus can be deployed or recovered without first having to pass the load-bearing rope through the center of the mechanism. The load-bearing rope can instead be removed or replaced within the mechanism during any part of the operation. This is particularly useful with heavy and oversized pieces of equipment. The slots can be filled by removable segments which are replaced after the load-bearing rope has been located within the mechanism. This has the advantage of allowing more traditional slip rings and the segment could be located easily within a tapered notch. Single gear driving would then be possible, but it is also equally possible to drive a slotted mechanism by two or more gears as shown in the drawings and described below. The embodiment shown and described is not affected by the notches, and these allow the load-bearing rope to be removed or placed within the mechanism as required without removal of the notch filling segment. More than one drive shaft is preferable to reduce the possibility of contact being lost with the center drive when the notch thereon passes the driving wheel. In the embodiments shown, all of the parts which rotate around the load-bearing rope 35 are slotted.

Referring now to FIGS. 10 to 17, a central rotating notched sleeve 151, having an annular flange **151*f* on its outer surface is provided. The sleeve 151 is notched at 115 to allow radial passage of the rope 35 through the notch 115 into the axial bore. An annular thrust bearing 170 separates the lower surface of the flange 151*f* from a main support plate 175 through which it passes via a central aperture 175*a*, also notched. The main support plate 175 also has two side apertures 175*b* and 175*c* through which the drive shafts of motors 176 and 177** pass.

A main support bearing 179 surrounds the outer surface of the sleeve 151 above the flange **151*f***.

The motor 176 drives winding gear 180 which is used to drive the winding of the rope around the central load-bearing rope 35. Winding gear 180 is a circular gear driving two further gears 181, 182 in the same direction. Gear train 180, 181, 182 drives a spur gear 185 also having a notch 115 coinciding with the notch 115 in the sleeve 151 , and keyed to the sleeve 151 by means of a keyway **185*k*. Rotation of the gear train 180, 181, 182 therefore drives the spur gear 185 and (by virtue of the keyway) the sleeve 151. Since the gears 181 and 182 are spaced apart, the notching of the assembly of the spur gear 185 and the sleeve 151 does not affect power transmission to the sleeve 151, since even if the notch 115 is adjacent one of the gears 181, 182, the other will still be contacting the teeth and will transmit power to the sleeve 151 for the time taken for the notch 115 to pass the gear 181 or 182** as the case may be.

A drum 190 is carried on a support arm 191 attached to the lower end of the sleeve 151 and therefore rotation of the drive train 180, 181, 182 by the motor 176 drives rotation of the arm 191 around the central axis of the load-bearing rope, thereby winding the cable on the drum 190 axially around the load-bearing rope 35 as it is payed out as described previously.

Hoist and payout of the cable on the drum 190 is driven by the motor 177 through the drive train to be described below. Motor 177 has a driveshaft **177*d* passing through the aperture 175*c* in the main support plate 175. A spacer 178 spaces a gear 200 driven by the shaft 177*d* from the lower surface of the main support plate 175. Gear 200 is part of a drive train 200, 201, 202 similar to the drive train 180, 181, 182 as previously described. Drive train 200, 201, 202 drives the rotation of a notched spur gear 205 having a notch 115 and located around the sleeve 151 on a bearing 203. The spur gear 205 is able to rotate relative to the sleeve 151, and is driven around the sleeve by the operation of the drive train 200, 201, 202. The drive train 200, 201, 202 meshes with an upper row of teeth 206 on the gear 205. Spur gear 205 also carries a lower row 207 of teeth which are clearly also driven in rotation by operation of the drive train 200, 201, 202. A further set of gears 210, 211, 212 mesh in a fashion similar to that described for the gears 180, 181, 182 with the lower teeth 207 of the spur gear 205. The gear 210 is located on a drive shaft connected to a right angled gearbox 215 where a bevel gear or similar arrangement drives rotation of a perpendicular second shaft 216, which through a pulley wheel drives the rotation of the drum 190 around its own axis by a belt, chain or similar such means. This allows the motor to hoist in or lower the power or signal cable on the drum. The gear box 215 is mounted on the drum support arm 191, which is held in place by a notched securing nut 220**.

The securing, e.g., locating C, nut 220 secures the winch support arm, the double row toothed gear 205 the single row toothed gear and two shims, which all slide up onto the lower half of the central rotating notched cylinder 17.

More than one drum can be provided on the embodiment described, and where two drums are provided, they can be rotated in opposite directions.

The central rotating notched cylinder is held in position by the thrust bearing and the main support bearing within which it can rotate freely.

The main support plate is attached to the ship or other structure and provides the support for the motors and the bearing housings for the main support bearing and thrust bearing.

All components preferably have a notch cut in them to allow the load-bearing rope to be swung into the mechanism. By use of the motor to rotate the winch drum around the load-bearing rope the central rotating notch can be lined up with the notch in the bearings and the main support plate. Using the motor to rotate the gear its notch can also be aligned and the load-bearing rope can either be placed within the mechanism or removed from it.

The teeth on the gears 180, 181, 182, etc. can be replaced by a pulley system such as that shown in FIG. **14*c* which uses a notched belt 185*b* running on gears 180', 181', 182' driving gear 185'**.

The motors used for driving any of the presently described embodiments can be of any suitable type. Conventional motors available for many years are eminently suitable, and any standard electric or hydraulic motors available for over 15 years by any of the manufacturers Charlin, Eaton, White, Mannesmann-Rexroth, Hawker Sidley and many others are suitable. Various different kinds of motors available for the winch and frame driving motors etc. will be well known to one of moderate skill in the art.

Figure 18:
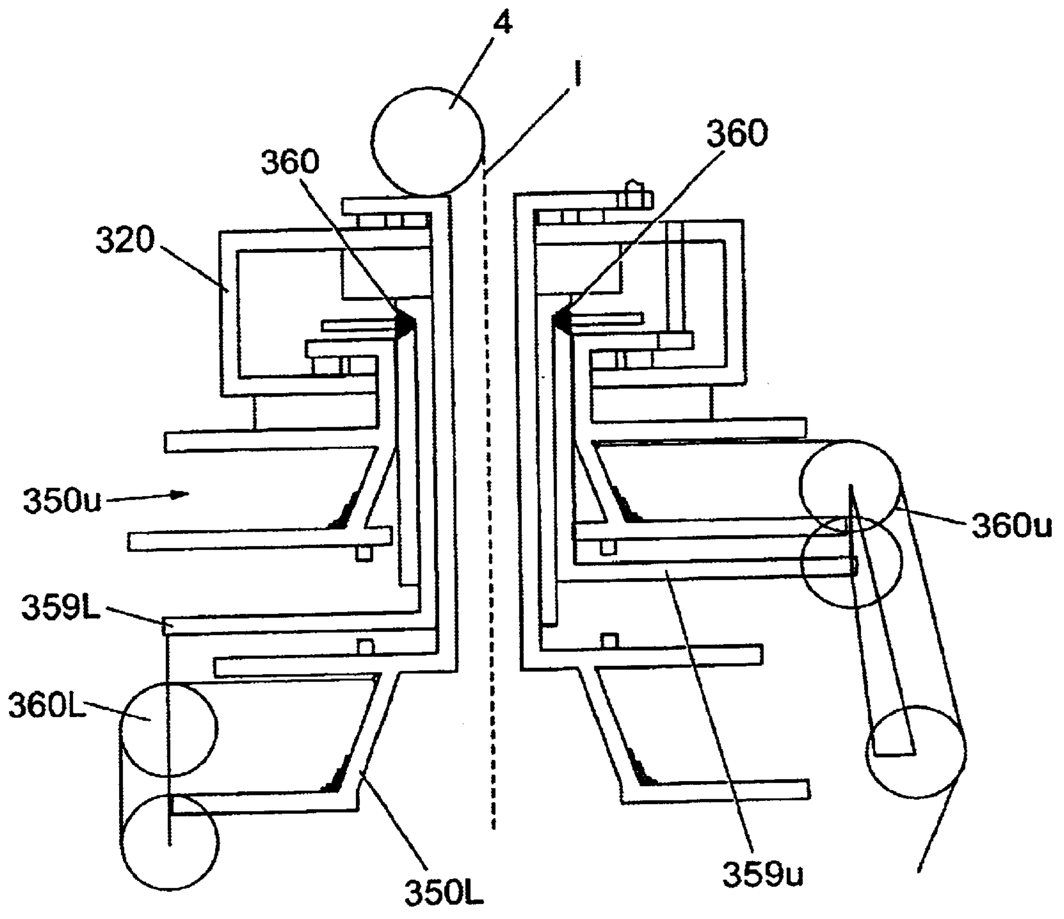
FIG. 18 shows a seventh embodiment of a cable winding device.

FIG. 18 shows a further device having a first drum **350*u* arranged above a second lower drum 350*l*, both of which are arranged around a load-bearing rope 1 which passes through their axes. The drums 350 each have a respective arm 359*u*/359*l* and spooling gear 360*u*/360*l* which spools off the cables in the upper and lower drums in different directions and can wind different cables (for example a fiber optic communications cable on the upper drum 350*u* and a high voltage power cable on the lower drum 350*l*) in opposite directions around the central load-bearing rope 1 in the same manner as the embodiment described with regard to FIGS. 8 and 9**.

In the FIG. 18 apparatus, two different cables wound onto respective drums **350*u* and 350*l* are paid out while the arms 359*u*/359*l* rotate around the load-bearing rope 1**.

Drums 350*u* have a top hat structure with a pair of annular flanges provided at the lower end of side walls. The cable is stored between the annular flanges, and the side walls define a cylinder through which the hoist rope 1 can pass axially. The arms 359 are each mounted on a sleeve with an annular bevel gear cut into an opposing edge to allow a single bevel drivehead 360 to drive each of the arms in opposite directions. The same or a different bevel drivehead can be used for each. Bevel drivehead 360 engages beveled edges on the arms 350 and drives them in opposite directions simultaneously. By a single force exerted from a motor (not shown), the arms can thus be driven in opposite contra-rotating directions around the central axis of the load-bearing rope 1 as it is payed out.

The drums are hung on a frame 320 which holds bearings and slip rings as previously described.

Although the embodiment shown in FIG. 18 is driven through a motor and the bevel drivehead 360, the apparatus could also be driven from a sleeve forming part of an arm or a drum and which could in certain embodiments protrude out of the assembly and be rotated using belts, gears, chains or similar mechanisms. The bevel gear arrangement shown in FIG. 18 could in that embodiment still remain to contra-rotate the arms under the power applied to the sleeve and therefore bevel gear 360.

The arms could also be driven independently using two separate motors.

Figure 19:
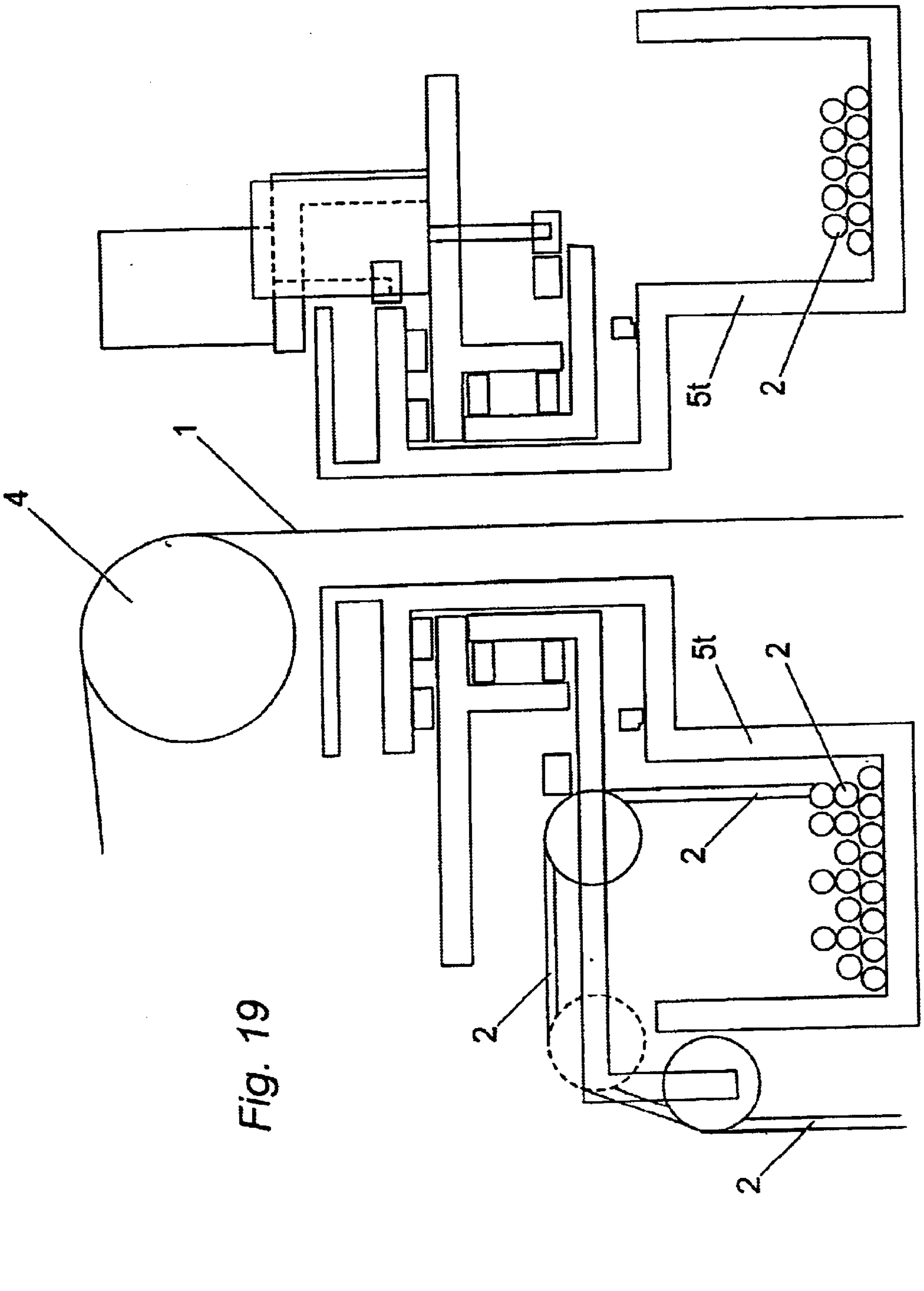
FIG. 19 shows an eighth embodiment of a cable winding device.

FIG. 19 shows a further cable winding device which has a trough 5*t* rather than a service cable sheath, e.g., drum 5 for storing the service cable 2. This is very useful for very thick or heavy cables not suitable for storage on the drum 5. The trough 5*t* is provided with spooling gear in the form of sheaves and can optionally incorporate tensioning devices such as a linear winch e.g. a pair of tires though which the cable can run and which retard the cable thereby tensioning it slightly. A further trough can be added to provide another service cable to be wrapped around the rope in the opposite direction to that of the first cable.

Figure 20:
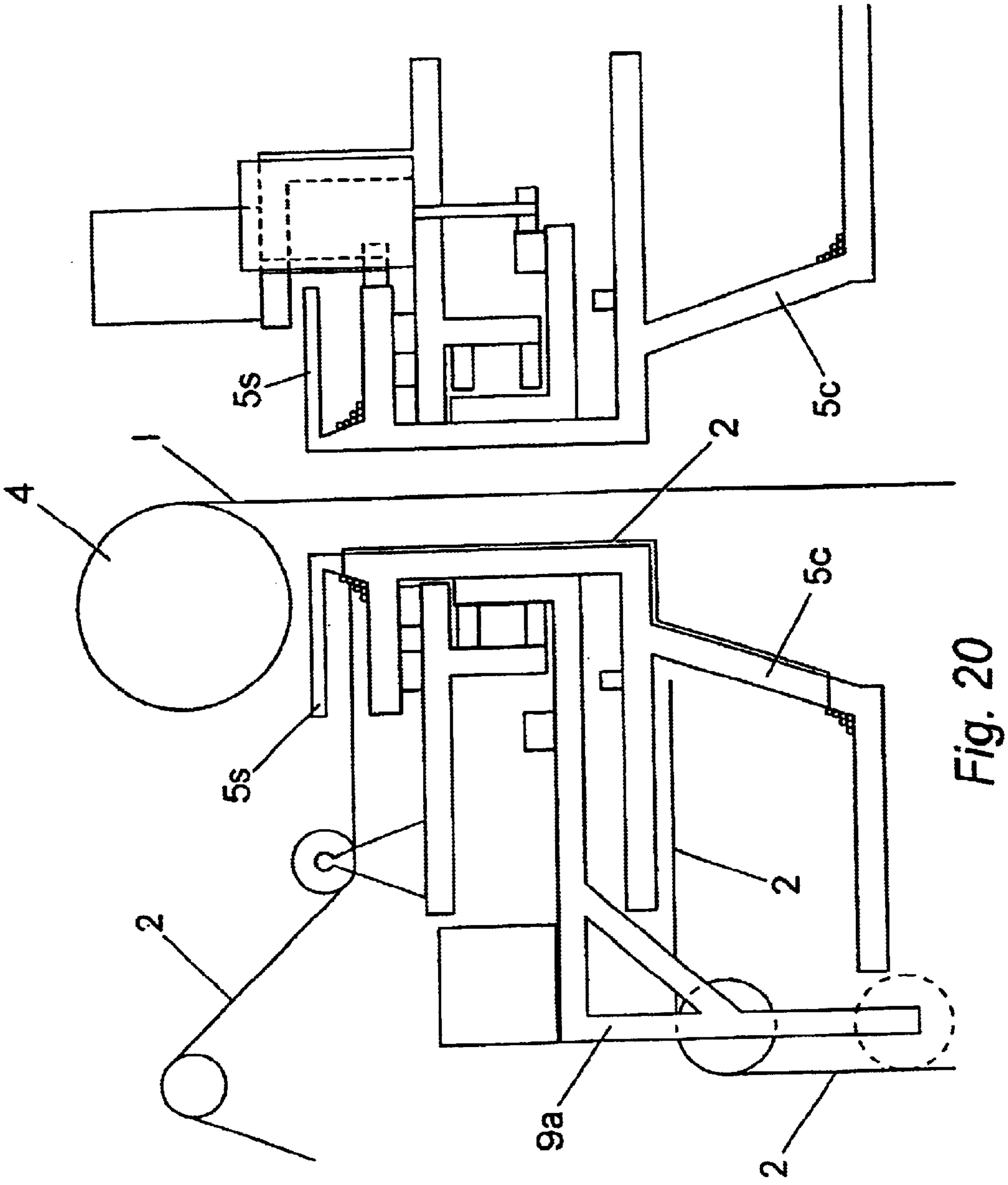
FIG. 20 shows a ninth embodiment of a cable winding device.

FIG. 20 shows a further cable winding device which dispenses with the need for slip rings. The FIG. 20 device is suitable for cables which will withstand a twist every turn or a pre-twisting of the cable before it is run onto the drum. The turns per meters of the cable paid out will be dependent on the diameter of the cable on the cable winch.

In the FIG. 20 device the signal/power service cable can be wound from a power supply or other service connection (not shown) via several guide sheaves onto a first drum 5*s* of small diameter. The small diameter drum 5*s* can be located on an upper part of the winch drum which can either be turned by a motor, or can remain stationary with an arm revolving to unwrap the cable from it. The purpose of the small diameter drum is to allow limited movement on the main drum as the hoist rope may twist thereby requiring more turns of the signal/power cable drum than were originally put onto the hoist rope as it was paid out.

The service cable 2 is typically paid out from the main cable winch drum 5 by a rotating arm 9*a* rotating in a direction which unwinds the cable 2 from the drum 5. The rotating arm 9*a* rotates in the opposite direction to wind on the cable 2. The arm 9*a* can be set to pay out at a preset tension and hoist if the tension is less than that preset tension.

In the FIG. 20 device, the service cable 2 is connected to the service (power signal etc.) and wound first onto the small drum 5*s*. An aperture in the small drum wall allows the service cable 2 to pass into the axial bore of the drum 5 where it runs parallel to the rope 1 to the level of the main lower drum 51. It passes through the wall of the main drum 51 and onto the spool from which it is unwound by the spooling gear on the rotating arm 9*a* in much the same manner as has been described previously. The cable can be applied to the drum 5 with a pre-twist so as to avoid kinking in the cable during use.

Further signal cables can be applied to the rope using the FIG. 20 device.

In other embodiments the cable drum can be arranged to rotate around the rope and/or can rotate on its own horizontal axis in order that the rope can be spooled off in a similar manner to other embodiments.

Figure 21:
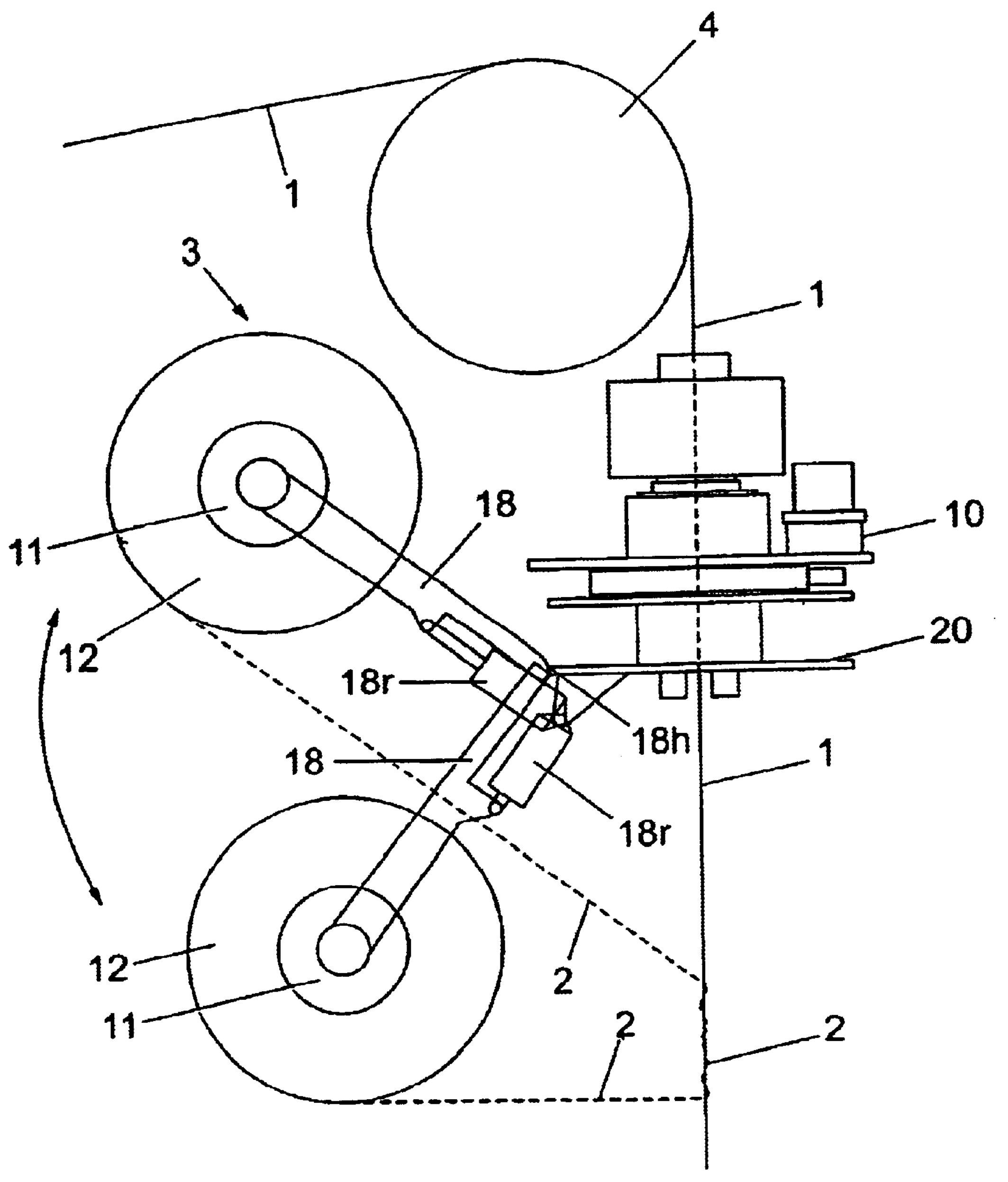
FIG. 21 shows a further embodiment of a winding device.

FIG. 21 illustrates a further embodiment in which the service cable 2 is reeled on a drum 3 and the drum 3 is itself rotated about the hoist rope 1 to achieve a helical wrap and unwrap. The service cable drum 3 may be constituted by a drum 12 removably mounted on a hub motor 11 which is carried on the end of an arm 18 rotatably mounted on a fixed frame 20 and driven by a motor 10. The arm 18 has a hinge 18*h* connecting it to the frame 20 and a hydraulic ram 18*r* to pivot the arm 18 about the hinge 18*h* relative to the frame 20 from the lower position shown in FIG. 2 to the higher position, so as to move the cable drum 3 out of the way of large loads being lifted by the hoist rope 1.

Further service cable drums could be added to be rotated by the motor 10.

Figure 22:
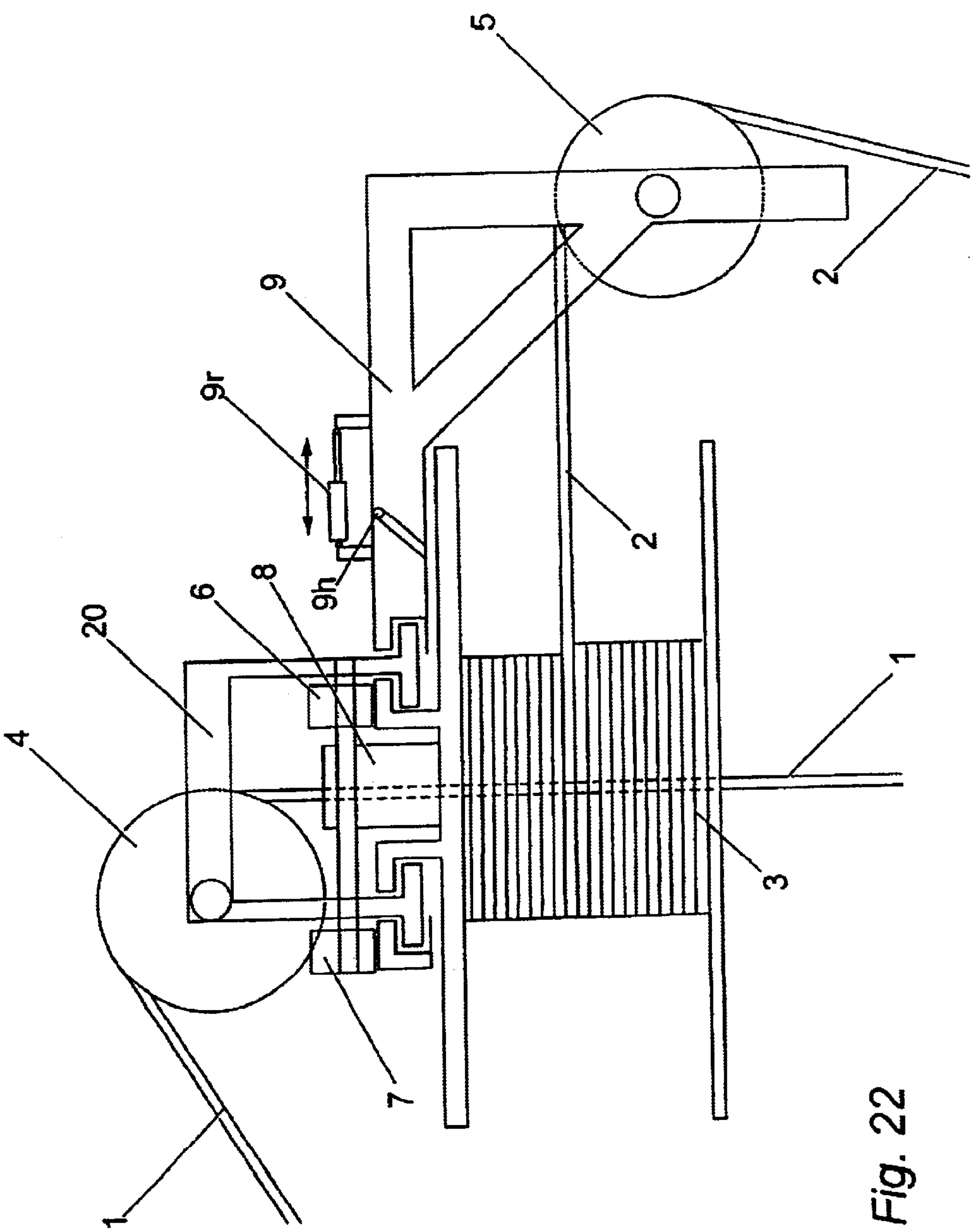
FIG. 22 shows a further device similar to the FIG. 3 device.

FIG. 22 shows a further embodiment similar to the FIG. 2 embodiment in which the service cable drum 3 is rotatably mounted on the lower part of the frame 20 with the rope 1 passing through an axial aperture in the service cable drum 3 and driven in rotation by a motor 6. The arm of the mounting frame 9 has a hinge 9*h* and a hydraulic ram 9*r* connecting two shoulders on opposite sides of the hinge 9*h*. The ram can be activated to draw the sheave-bearing part of the arm 9 upwards out of the way of large objects being lifted.

Figure 23:
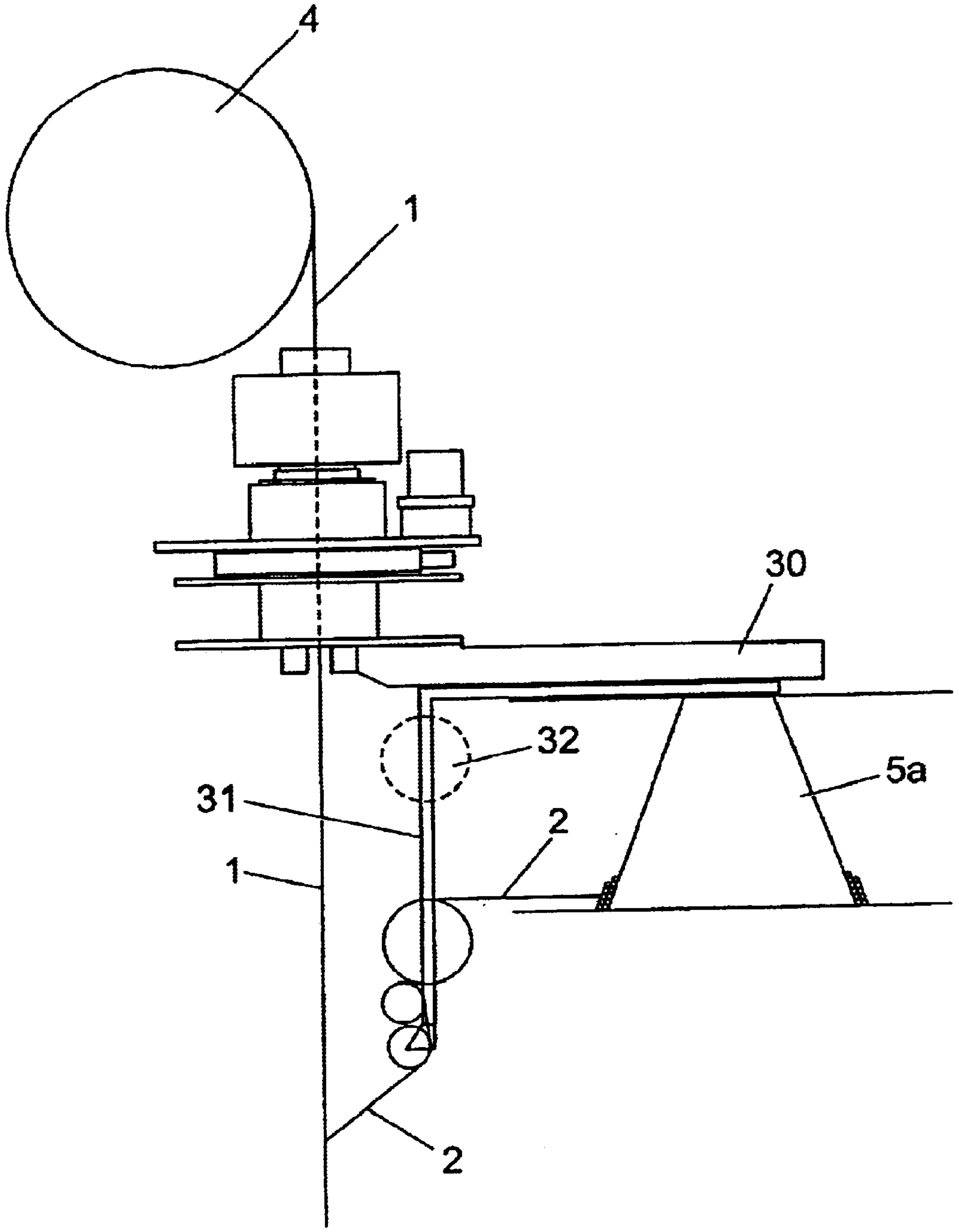
FIG. 23 shows a further embodiment of a winding device.

FIG. 23 shows a further embodiment in which the service cable 2 is held on a drum 5*a* which is fixed to an arm 30 that can rotate about the axis of the rope 1. The drum 5*a* does not need to be rotatably mounted on the arm 30 so that it rotates on its own axis but instead has a further arm 31 that rotates about the axis of the drum 5a and carries the cable via spooling gear 32 to the rope 1.

The drum 5*a* may have a tapered surface and this provides another aspect of the invention.

Other modifications may be made within the scope of the invention.

What is claimed is:

1. An apparatus for use in handling a load, which comprises:

a load-bearing rope;

a mechanism for paying out and recovering the load-bearing rope;

at least one service cable holder for holding a respective service cable with a length of the service cable extending therefrom; and a wrapping device for rotating the at least one service cable around the load-bearing rope as the at least one service cable and the load-bearing rope are paved out to wrap the at least one service cable and the load-bearing rope around each other, and to unwrap the at least one service cable and the load-bearing rope from each other as they are recovered, wherein at least a portion of the wrapping device can be moved to accommodate large objects.

2. The apparatus according to claim 1, wherein the at least one service cable includes two service cables and the wrapping device is adapted to wrap one of the two service cables over the other service cable.

3. The apparatus according to claim 1, wherein the at least one service cable holder comprises a drum.

4. The apparatus according to claim 1, wherein the wrapping device includes a rope sheave and a rope winch, wherein the load-bearing rope passes from the rope winch over the rope sheave and thereafter extends to the load along a substantially straight axis.

5. The apparatus according to claim 4, which includes a service cable sheave rotatably mounted on the apparatus and capable of movement in a circular path around the substantially straight axis, and wherein a service cable passes over the service cable sheave.

6. The apparatus according to claim 4, wherein the rope winch, the service cable holder and the wrapping device each have a respective driving motor.

7. The apparatus according to claim 4, wherein the rope winch, the service cable holder and the wrapping device are driven by a single source through appropriate mechanical linkages.

8. The apparatus according to claim 1, wherein the wrapping device comprises the at least one service cable holder being arranged for rotation about an axis which coincides with the axis of the rope.

9. The apparatus according to claim 8, which includes a structural member upon which the at least one service cable holder is rotatable, the structural member being arranged for movement in a circular path about the substantially straight axis.

10. The apparatus according to claim 1, wherein the at least one service cable holder has a central aperture through which the load-bearing rope passes.

11. The apparatus according to claim 1, wherein the at least one service cable holder includes two service cable holders, each having a respective service cable sheave, the sheaves being capable of rotation in opposite directions to one another.

12. The apparatus according to claim 1, wherein the at least one service cable holder includes two service cable holders and the wrapping device is adapted to wrap one of the service cables over the other service cable in the same direction but at a different pitch.

13. The apparatus according to claim 1, having at least one slot to facilitate attachment of the load-bearing rope to the rest of the apparatus.

14. The apparatus according to claim 13, wherein the at least one slot extends axially on at least one component of the apparatus.

15. The apparatus according to claim 13, wherein the slot is on at least one component that is driven in rotation by a drive train having more than one point of contact with said at least one component.

16. The apparatus as claimed in claim 15, wherein the drive train comprises at least two transmission gears which contact said at least one component at spaced-apart locations.

17. The apparatus as claimed in claim 15, wherein the drive train comprises a belt driven by a driver and contacting said at least one component in at least two spaced-apart locations.

18. The apparatus according to claim 1, wherein the wrapping device, having an axis, rotates around the axis of the load-bearing rope, but does not rotate about its own axis.

19. A method for use in handling a load, the method comprising the steps of:

paying out a load-bearing rope with a mechanism;

wrapping at least one service cable around the load-bearing rope with a wrapping device as the load-bearing rope is paved out;

subsequently unwrapping the at least one service cable from the load-bearing rope with the wrapping device as the load-bearing rope is recovered; and moving a portion of the wrapping device out of the path of the load supported by the load-bearing rope.

20. The method according to claim 19, wherein the at least one service cable includes two service cables that are wrapped around and subsequently unwrapped from the load-bearing rope and one of the two service cables is wrapped over the other service cable.

21. The method according to claim 20, wherein one service cable of the two service cables is wrapped over the other service cable in the same direction at a different pitch.

22. The method according to claim 19, wherein the at least one service cable includes two service cables that are wrapped around and subsequently unwrapped from the load-bearing rope in opposite directions to each other.

23. The method according to claim 19, further including the steps of:

attaching the load-bearing rope to the mechanism for paying out and recovering the load bearing rope;

attaching the load-bearing rope to the load; and subsequently attaching the load-bearing rope to a wrapping device for wrapping the service cable around the load-bearing rope, wherein the wrapping device has at least one axial notch and the load-bearing rope is passed through the at least one axial notch as the wrapping device is being attached to the load-bearing rope.

* * * * *

UNITED STATES PATENT AND TRADEMARK OFFICE
CERTIFICATE OF CORRECTION

PATENT NO. : 6,698,722 B1 Page 1 of 1
DATED : March 2, 2004
INVENTOR(S) : Alexander Charles Crawford It is certified that error appears in the above-identified patent and that said Letters Patent is hereby corrected as shown below:

Column 12,
Line 20, delete "paved" and replace with --payed --.

Signed and Sealed this

Twentieth Day of July, 2004

JON W. DUDAS
*Acting Director of the United States Patent and Trademark Office*

UNITED STATES PATENT AND TRADEMARK OFFICE

CERTIFICATE OF CORRECTION

PATENT NO. : 6,698,722 B1
DATED : March 2, 2004
INVENTOR(S) : Alexander Charles Crawford It is certified that error appears in the above-identified patent and that said Letters Patent is hereby corrected as shown below:

Title page,
Item [63], Related U.S. Application Data, please delete "This is a continuation of application Ser. No. 09/274,259, filed Mar. 22, 1999, now U.S. Pat. No. 6,267,356" and replace with -- This application is a national phase application under 35 U.S.C. Section 371 of International Application No. PCT/GB00/00978, filed March 22, 2000 and published in English, which is a continuation of U.S. Application Serial No. 09/274,259, filed March 22, 1999, now U.S. Patent No. 6,267,356. --;

Column 10,
Line 61, delete "paved" and replace with -- payed --.

Signed and Sealed this

Twenty-first Day of September, 2004

JON W. DUDAS
*Director of the United States Patent and Trademark Office*